(12) United States Patent
Borg et al.

(10) Patent No.: US 7,246,040 B2
(45) Date of Patent: Jul. 17, 2007

(54) PROCESS OF REMOTE SENSING DATA

(75) Inventors: Erik Borg, Joachimsthal (DE); Bernd Fichtelmann, Neustrelitz (DE); Jan Böttcher, Niederkassel (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 0 days.

(21) Appl. No.: 11/227,894

(22) Filed: Sep. 15, 2005

(65) Prior Publication Data
US 2006/0080037 A1    Apr. 13, 2006

(30) Foreign Application Priority Data
Sep. 15, 2004 (DE) ............. 10 2004 045 556
Sep. 15, 2004 (DE) ............. 10 2004 045 562
Sep. 15, 2004 (DE) ............. 10 2004 045 563

(51) Int. Cl.
*G06F 19/00*    (2006.01)
(52) U.S. Cl. .................... 702/188; 714/25
(58) Field of Classification Search ............ 702/188, 702/182–185; 324/76.11; 714/25
See application file for complete search history.

(56) References Cited

U.S. PATENT DOCUMENTS

| | | | |
|---|---|---|---|
| 6,484,099 B1 | 11/2002 | Holzer-Popp et al. | |
| 2003/0018510 A1* | 1/2003 | Sanches .................. | 705/9 |
| 2004/0208396 A1 | 10/2004 | Gunther et al. | |

FOREIGN PATENT DOCUMENTS

| | | |
|---|---|---|
| DE | 199 39 732 | 3/2001 |
| DE | 103 54 752 | 8/2004 |
| DE | 103 58 938.4 | 7/2005 |
| DE | 10 2004 024595.9 | 8/2005 |
| EP | 1091188 | 4/2001 |

OTHER PUBLICATIONS

D. Goodenough, et al., Queries and their Application to Reasoning with Remote Sensing and GIS, IEEE, 1994.
S. Matwin, et al., Machine Learning and Planning for Data Management in Forestry, IEEE Expert, Dec. 1995, pp. 35-41.
H. Shariat, Knowledge-based System for Analysis of Aerial Images, SPIE vol. 1381 Intelligent Robots and Computer Vision IX: Algorithms and Techniques (1990), pp. 306-317.
Bibliograph Data and sections 4-7 of Chapter II of "Multi-Criteria Analysis—Introduction to the Theory of Decision Making with Multiple Goals", by H.-J. Zimmermann and L. Gutsche (1991).

(Continued)

*Primary Examiner*—Edward Raymond
(74) *Attorney, Agent, or Firm*—Cohen Pontani Lieberman & Pavane LLP

(57) ABSTRACT

The invention relates to the processing of remote sensing data, especially remote sensing data recorded by a satellite. A plurality of processing routines for processing the remote sensing data is available or is prepared. A defined requirement on the use of the remote sensing data is entered by the use of an interface. In a linker, the defined requirement is used to select a certain number of processing routines and to link them together, so that the selected processing routines can process the remote sensing data in such a way that the defined requirement is fulfilled.

13 Claims, 14 Drawing Sheets

OTHER PUBLICATIONS

Subsections 11.4 to 11.8 of Chapter 11 of "Practice of Digital Image Processing and Pattern Recognition", by Haberäcker, Peter (1995).

D. Charlebois, et al., Machine Learning from Remote Sensing Analysis, Proc. IGARSS '93, pp. 165-172, 1993.

V. Clement, et al., A Multi-Specialist Architecture for Sensor Fusion in Remote Sensing, Proceedings 11th IAPR International Conference on Pattern Recognition, vol. I, Conf. A: Computer Vision and Applications (ICPR 11, The Hague, The Netherlands, Aug. 30-Sep. 3, 1992), IEEE Computer Society Press, Los Alanitos, California 1992, 202-206.

Anja Klisch et al., Bereitstellung von Fernerkundungsparametern für das Erosionsmodell EROSION 3D am Beispiel des Blattflächenindizes und des Bedeckungsgrades, S. W. Dech et al. (Hrsg.): Tagungsban 20. DFD-Nutzerseminar, Oct. 6-8, 2003, pp. 66-75.

Andreas Mueller et al., ARES—A New Reflective/Emissive Imaging Spectrometer for Terrestrial Applications, S. W. Dech et al. (Hrsg.): Tagungsband 20. DFD-Nutzerseminar, Oct. 6-8, 2003, pp. 31-43.

Stan Matwin et al., Machine Learning and Planning for Data Management in Foretry, Environmental Application of AI, Dec. 1995, pp. 35-41.

\* cited by examiner

| Scale 1:X | Mapping type | Geosphere | Climatology | Hydrology | Pedology | Vegetation Geography | Ecology | Environmental Programs | Planning Agencies | Planning Level | Administrative Level | Line | Surface | Satellite Pixel Resolution |
|---|---|---|---|---|---|---|---|---|---|---|---|---|---|---|
| $10^8$ | Small-scale mapping | geo-sphere | zonal climate | | soil zone | vegetation belt | | | | | National alliance | 12 km | 40 km² | 1 |
| $10^7$ | Small-scale mapping | | large-scale climate | drainage basins, 1st-order rivers | soil region | veg. zone | biogeo-sphere | GEMS GRID CORINE | | | nation | | | 2 |
| $10^6$ | Small-scale mapping | | | | | | | | | | | | | 3 |
| $10^5$ | Medium-scale mapping | region | large landscape climate | drainage basins, 2nd-order rivers | soil province | veg. formation | eco-system complex | National Parks Program MAB | national government | country development plan | state | 1.2 km | 400 m² | 4,5 |
| $10^4$ | Large-scale mapping | core | area climate | | soil society | veg. class | | | regional association | regional zoning plan | district | | | 17 6,8 18 |
| $10^3$ | Large-scale mapping | | local climate | drainage basins, 3rd-order rivers | soil landscape | veg. order | eco-system | long-term observation areas | community or planning association | local zoning plan | town | 120 m | 40 m² | 9 10 |
| $10^2$ | Large-scale mapping | top | climate top | | pedo-complex | veg. association | bio-cenosis | | community | | neighborhood | 12 m | 4 m² | 11,13 15,19 7,12,14 16 |
| $10^1$ | Large-scale mapping | | boundary surface climate | hydro-top | pedo-top | veg. society | population | environmental measuring programs | | building plan | | 1.2 m | 0.4 m² | 20, 21 22 |
| $10^0$ | Large-scale mapping | | | lysimeter | pedon | phyto-top | indi-vidual | | | | lot | 0.12 m | 0.04 m² | 24 25 23 | political decision-making potential → / political action potential →

1. DMSP/SSMI
2. METEOSAT/IR
3. METEOSAT/VIS
4. NOAA-POEMS/AVHRR
5. NOAA-GOES/VISSR-VIS
6. EOS/MODIS
7. EOS/ASTER-VNIR
8. ENVISAT/MERIS
9. Landsat-4,5/TM-K6
10. Landsat-7/ETM+-K6
11. Landsat-4,5,7/K1-5,7
12. Landsat-7/ETM+PAN
13. ERS-1,2/SAR
14. JERS-1/SAR
15. SPOT/HRV
16. SPOT/PAN
17. IRS-P3/MOS
18. IRS/WiFS
19. IRS/LISS
20. IRS/PAN
21. Rapid Eye/MS
22. Quick Bird/MS
23. Quick Bird/PAN
24. IKONOS/MS
25. IKONOS/PAN

| | |
|---|---|
| GEMS | – Global Environmental Monitoring System |
| GRID | – Global Ressource Information Database |
| CORINE | – Coordination de l'Information sur l'Environment |
| MAB | – Man and Biosphere |

   Aerial images

Fig. 15 Fig. 16
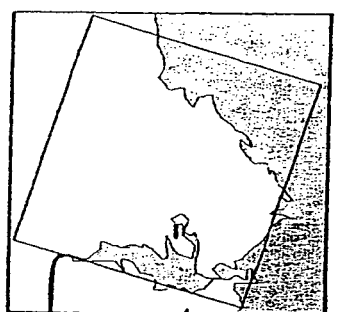
25
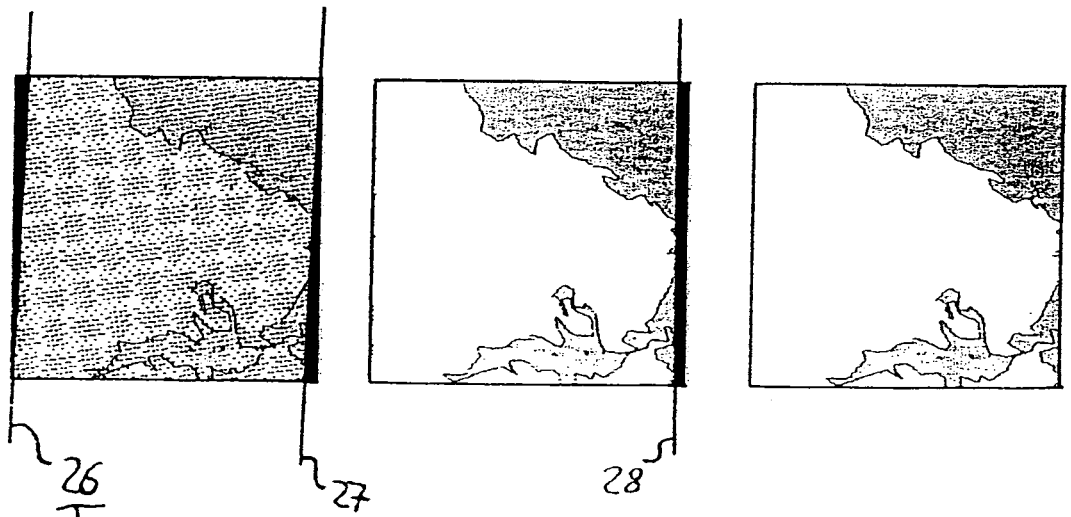
26  27  28
Fig. 17  Fig. 18  Fig. 19

PROCESS OF REMOTE SENSING DATA

BACKGROUND OF THE INVENTION

1. Field of the Invention

Remote sensing data form the basis for many different types of studies of the environment around us, ranging from the discovery of valuable mineral deposits, for example, by satellite-supported mapping of the earth to the acquisition of environmentally relevant data. Thus a large circle of users can put these data effectively to use. The same data can be used to solve problems in various areas of interest.

2. Description of the Related Art

A first aspect of the invention relates to a method and arrangement/apparatus for processing remote sensing data, especially remote sensing data which have been recorded by a satellite.

Existing methods and systems for the automatic processing of remote sensing data usually serve a single purpose. In some cases, it is assumed that the user has a great deal of knowledge about satellites, about remote sensing data, and about how to process such data. The networking of the reception, storage, and distribution of the remote sensing data and of the data products derived from them will continue to increase both nationally and internationally in the coming years. Thus larger quantities of remote sensing data, which can be used to solve a wide variety of problems, will become available. Aside from that, the databases already in existence are not being utilized as fully as possible. New remote sensing missions, furthermore, are being launched at regular intervals, which means that the quantities of data can be expected to continue to increase. For this reason, it is becoming more difficult for the user of the remote sensing data and of the data products to retain an overview of the existing possibilities and to select the right data and the right products.

It is an object of the first aspect of the present invention to provide a method and arrangement for processing remote sensing data, which make it possible to minimize the effort required of the user of the remote sensing data, despite the existence of a large number of different goals which can be achieved by the use of such data. In particular, the object is to make it unnecessary for the user to have wide-ranging expert knowledge about satellites and/or the acquisition of remote sensing data.

A second aspect of the invention relates to a method and arrangement/apparatus for the selection of remote sensing data, especially remote sensing data which have been recorded by a satellite.

In the existing systems for searching available remote sensing data to find those which are suitable for a specific purpose, it is currently assumed that the user has a great deal of knowledge about satellites and about remote sensing data. As the variety of data increases, there will necessarily be a corresponding increase in the number of selection criteria.

The networking of the reception, storage, and distribution of the remote sensing data and of the data products derived from them will continue to increase both nationally and internationally in the coming years. Thus larger quantities of remote sensing data, which can be used to solve a wide variety of problems, will become available. Aside from that, the databases already in existence are not being utilized as fully as possible. New remote sensing missions, furthermore, are being launched at regular intervals, which means that the quantities of data can be expected to continue to increase. For this reason, it is becoming more difficult for the user of the remote sensing data and of the data products to retain an overview of the existing possibilities and to select the right data and the right products.

It is an object of the second aspect of the present invention to provide a method and arrangement for selecting remote sensing data, which make it possible to select from among a large number of available alternatives those which come closest to meeting the user's requirements. It should be possible to obtain reproducible results in this way, and there should be no need for expert knowledge.

A third aspect of the invention relates to a method and arrangement/apparatus for the automatic georeferencing of remote sensing data, especially of remote sensing data which have been recorded by a satellite.

The georeferencing of the remote sensing data (i.e., the correlation of the remote sensing data to geographic information, e.g., from a map of the earth's surface) is a fundamental task of the further processing of the remote sensing data. It is a prerequisite in particular for the generation of derived data, such as data which can be useful to agriculture. Because the remote sensing data of satellites are present initially in the form of so-called satellite projections, and because these are usually distorted in comparison with geographic projections, we also speak of the "rectification" of remote sensing data or of satellite images. There are essentially two different procedures which have been used in the past to do this. In the method of position calculation, a projection model is used, which simulates the motion of the satellite as accurately as possible. For this purpose, it is necessary to have data on the satellite's orbit, on the position of the satellite at the time in question, on the position of the recording system (including one or more sensors) in the satellite, on the projection lenses, and on the form of the space body.

In the method based on so-called "control points", characteristic image structures are used, which can be identified in both the satellite image and again in the reference image. Positions can thus be determined by comparing the positions in the two images. In contrast to the projection model, however, only the positions of the control points are known. All other positions are determined or assigned by the use of an interpolation model. Combinations of the two methods are also used.

In both of these cases, the goal of the georeferencing is to correlate the measured pixels of the remote sensing data with geographic data. In the case of interactive methods (i.e., methods requiring the participation of a human operator), a geographic reference (e.g., a rectified image or a geographic map) is usually used to achieve this geographic correlation. The automatic methods are based in most cases on the exact knowledge of the projection geometry and on the availability of the corresponding projection parameters required.

A satellite projection is a projection obtained by projecting an observed object (e.g., an area of the earth's surface or an area of some other body in space, e.g., another planet) onto the sensor plane (or image plane) of the satellite. The result of the projection thus depends on the position of the satellite and on the angle at which the satellite is viewing the object being observed for remote sensing. The remote sensing data present in the satellite projection may already have been subjected to certain corrections (e.g., correction of the offset, amplification of a sensor signal) and/or to other operations. In particular, the measurement signals supplied by a sensor of the satellite during a scanning process may already have been converted into the common coordinate system of the satellite projection. For example, the sensor's measurement signals which are used are obtained successively during the scanning process.

In many methods of georeferencing, the information content of the remote sensing data (e.g., multi-spectral data) is altered. For example, the data can be rectified onto a fixed data grid (e.g., a grid of lines of equal geographic latitude and longitude), and each of the individual pixels mapped onto this grid will usually represent a combination of several pixels, which were originally adjacent to each other in the satellite projection. What takes place, therefore, is a kind of averaging. As a result, the grayscale values measured by a sensor of the satellite, for example, or the spectral characteristics measured by the satellite are not preserved and are therefore unavailable for further processing only in their original form. This procedure, however, has become established especially in the area of interactive image processing, because the operator can compensate intuitively for possible changes during the further course of processing.

The change in grayscale values or spectral characteristics, however, is troublesome precisely in cases where the data are to be subjected to further processing automatically and physical relationships are to be taken into account. After the averaging, the original grayscale values or the original spectral characteristics can no longer be calculated. The results will therefore suffer from a certain error. The goal, however, is to derive highly accurate quantitative data and/or parameters.

One of the objects of the present invention is therefore to provide a method and arrangement of the type indicated above in which physical properties such as the grayscale values and spectral characteristics of the remote sensing data measured by the satellite remain preserved. In addition, there should be no need for the operators to make any interventions or to take any actions, and there should be no need for the user to have expert knowledge to complete the georeferencing successfully.

SUMMARY OF THE INVENTION

According to the first aspect of the invention, it is proposed that existing processing routines for processing the remote sensing data be selected automatically and that these selected processing routines be used to process the remote sensing data. The processing routines are selected as a function of the specific goal which the remote sensing data are to achieve and/or the purpose they are supposed to serve.

At least one of the selected processing routines can be a thematic processing routine which is necessary to fulfill at least one of the requirements on the use of the remote sensing data, that is, to fulfill a requirement pertaining to a specific theme which the remote sensing data are intended to illuminate (e.g., the identification of certain substances in an area covered by the remote sensing). Many different thematic processing routines can be available. When the data are processed, these routines can use supplemental data on the observed objects and/or observed areas, i.e., supplemental data which are related to the theme of the evaluation. For example, the supplemental data can establish the relationship of the spectrum and/or wavelengths of the electromagnetic radiation to the presence and/or local concentration of certain substances (e.g., chlorophyll, ozone), to the object temperature, or to the presence of certain kinds of vegetation. The electromagnetic radiation which is emitted and/or reflected by the object or substance is detected by a sensor, which generates the remote sensing data.

In particular, some of the processing routines could be said to be standard (standard processing routines); these processing routines are thus executed on a standard basis for a large number of different requirements. These standard processing routines can also be routines which are always executed (with certain exceptions). For example, they can be routines for accommodating the properties of a sensor (e.g., amplification and offset, so-called calibration), for correlating geographic data (e.g., geographic latitude and longitude) with the remote sensing data, for correcting the influence of the atmosphere on the remote sensing data (e.g., scattering effects and reflections), and/or for preparing a geographic map which shows the results of the processing of the remote sensing data.

"Processing routines" are defined processes for processing remote sensing data and can be implemented in the form of software modules, for example. The processing routines preferably have standardized interfaces for the input of the remote sensing data to be processed and for the output of the processed remote sensing data. As a result, any desired type of remote sensing data arriving at the interface (e.g., remote sensing data recorded by different sensors and/or by different satellites) can be worked up appropriately and processed by the processing routines. In addition, any of these processing routines can be easily replaced by new ones. It is also possible, however, at least in certain cases (e.g., standard processing routines), to specify the sequence in which the data are to be processed, which means that a certain processing routine can be executed only before or only after a certain other processing routine. The processing routines, however, are preferably executable successively in any desired order.

It is also preferred that at least some of the processing routines adapt themselves automatically to a given task, especially to establish a concrete link with other routines and/or to process certain types of remote sensing data. So that this self-configuration can be accomplished, the processing routine can use metadata based on the remote sensing data to establish the format and/or the properties of the remote sensing data. For example, the processing routine can use the metadata to determine the swath width of the sensor which has recorded the remote sensing data, to find the maximum geometric resolution (pixel resolution) which can be achieved by dividing a recorded image into pixels, and/or to acquire other information concerning the processing of the remote sensing data. "Metadata" are data which are generated in addition to the remote sensing data after the satellite data have been received by a receiving station on the ground. Metadata include in particular information on the sensor which has recorded the remote sensing data and the time at which the satellite data were received by the receiving station.

The invention makes it possible to take into consideration the large amount of remote sensing data which might be useful for a certain study question and/or to include such remote sensing data in a joint analysis. Because the remote sensing data can be evaluated automatically, large bodies of data can be completely and systematically analyzed. The invention makes it possible in particular to shorten significantly the time required for the preparation of so-called "remote sensing data products" ("value-added products"), for which it is necessary to process the data in a special way by the use of supplemental information (e.g., supplemental data derived from the metadata).

In particular, a method for processing remote sensing data, especially remote sensing data recorded by a satellite, is proposed, where:

processing routines for processing the remote sensing data are available and/or are prepared, these processing routines being suitable for processing a large number of different types of remote sensing data; and where a plurality of processing routines is selected automatically on the basis of at least one defined requirement on the use of the remote sensing data, the selected processing routines being automatically linked together, so that the selected processing routines fulfill at least one defined requirement by processing the remote sensing data.

By defining one or more requirement, the user can avoid the burdensome necessity of having to learn how to operate complex systems. Because of the availability of the processing routines, the most suitable processing routines can be selected automatically and linked with each other without any action on the part of the user, and the processing can then be carried out. In addition, the processing can be carried out in the same way again with the use of different remote sensing data (e.g., data recorded over a different period of time).

The remote sensing data can also be selected automatically, furthermore, on the basis of the minimum of one defined requirement, so that the selected remote sensing data are suitable for fulfilling the requirement. Appropriate queries can be addressed to the user (e.g., interactively through the use of software), so that the automatic processing of the remote sensing data can be initialized and configured properly. A suggestion as to which remote sensor (or which remote sensing data) should be selected can be generated automatically on the basis of the information entered by the user. It is also possible to generate multiple suggestions automatically, which are evaluated and/or ranked in correspondence with the degree to which they fit the user's requirements. Thus the user obtains various alternatives for achieving his goal. The user can then select one of the alternatives, for example, or the alternative which best fits the requirements can be selected automatically. In cases where the user is provided with a suggestion, suitable remote sensing data and/or a linking of suitable processing routines can be made available as output to the user.

In particular, the requirements can be formulated in the form of a requirement profile with a plurality of sub-requirements. The requirement profile can also have a plurality of categories, so that a plurality of properties of the remote sensing data and/or of the goal of the processing of the remote sensing data can be entered or derived. The requirement profile can also contain boundary conditions such as a cost limit specified by the user. Essential information which can be supplied to allow the inventive configuration of the processing of the remote sensing data includes the local resolution of an observed object covered by the remote sensing data, the temporal resolution present during the sensing of the observed object, the spectral resolution of the remote sensing data, and/or the radiometric resolution (e.g., number of digital memory bits available per pixel).

A process chain for the processing of the selected remote sensing data is preferably formed by linking the selected processing routines together. The remote sensing data are then processed in succession in the process chain by each of the selected processing routines.

In addition, an arrangement for the selection of remote sensing data is proposed, especially for the selection of remote sensing data which have been recorded by a satellite, where the arrangement has the following components:
- a plurality of processing routines for processing the remote sensing data;
- an interface for entering at least one defined requirement on the use of the remote sensing data;
- a linking unit, which is designed to select at least one subset of the processing routines on the basis of the minimum of one defined requirement and to link these routines together, so that the selected processing routines can fulfill the minimum of one defined requirement by processing the remote sensing data.

The remote sensing data are processed in particular in a completely automatic fashion by the processing routines. In particular, the selected processing routines can be linked to form a process chain, where the remote sensing data are processed automatically in the process chain by each one of the selected processing routines in succession.

The invention also includes a computer program for processing remote sensing data, where the means of the computer program in the form of program code are designed to execute the inventive method in at least one of its forms. In particular, the program code means can be stored on a computer-readable data storage medium. The scope of the invention also includes a data storage medium and/or a computer system, on which a data structure is stored, which executes the program after being loaded into a working and/or main memory of a computer or computer network. Via a long-distance data network, the computer program can access directly at least one archive system in which remote sensing data are stored.

According to the second aspect of the invention, a method for selecting remote sensing data is proposed, especially for selecting remote sensing data which have been recorded by a satellite. Here:
- task profile data are used, which define the tasks and/or goals for which the remote sensing data are to be used;
- at least one physical data property, especially a resolution, of the remote sensing data is assigned to the task profile data, so that at least one requirement on the use of the remote sensing data is defined;
- the data properties of available remote sensing data are checked against the use of the minimum of one requirement to determine whether and/or to what degree the minimum of one requirement can be fulfilled by the available remote sensing data; and
- a result of the determination is automatically made available as output.

The "selection of remote sensing data" is understood to be both the selection of already existing remote sensing data and the selection of remote sensing data which will become available in the future. Accordingly, "available data" are understood to include data that will be available in the future. The selection is made possible on the basis of the requirements, especially a requirement profile, and the result of the previously mentioned determination. The data can be accessed (e.g., called up and loaded) immediately thereafter or at a later time. It is also possible to cancel such access, when it is found, for example, that the cost of accessing the data is unexpectedly high.

The physical data properties are in particular one or more of the following: the local resolution of an observed object covered by remote sensing data, the temporal resolution at which an observed object was recorded, the spectral resolution of the remote sensing data, and/or the radiometric resolution (e.g., number of digital memory bits available per pixel).

The task profile data are generated, for example, in dialog with the user. By entering a series of statements, for example, the user defines the tasks for which the remote sensing data are to be used. Such statements pertain, for example, to the temporal-spatial dynamics of the phenomenon to be studied through evaluation of the remote sensing data (e.g., phenological changes in vegetation, changes over time in the electromagnetic radiation emitted by an observed surface or in the concentration of chlorophyll in a body of water). The user can also state, for example the (e.g., scientific) research area and/or the area of economic or administrative area (e.g., preparation of maps for a residential community) for which the remote sensing data are to be used. The information required by the user can be entered in either a precise or an imprecise manner. So that such statements can be made, a user interface with a template can be made available, which makes it possible for the user to enter imprecise information.

In correspondence with the physical data properties mentioned above by way of example, the requirements can restrict the range of the remote sensing data with respect to their spatial, temporal, spectral, and radiometric resolution. That is, only data with the selected limited resolution are used as long as they are able to fulfill the requirements completely.

In particular, specific rules are used to define the requirements. A requirement profile can be set up, which describes the requirements to be fulfilled by the remote sensing data or by the system which processes the remote sensing data (including the processing routines). In addition, the components of the task profile (and optionally of a user profile, see below) can be checked for consistency, so that the system:

can clarify any discrepancies interactively with the user and/or prepare a corrected task profile upon request. The corrected task profile can replace the original task profile, and the method can be executed again as described above on the basis of the corrected task profile.

Optionally, a user profile can also be drawn up, e.g., again in dialog with the user: By making a series of statements, the user assembles a personal data profile. This profile includes, for example, information on his purpose (i.e., on the themes the user wishes to pursue in his work), on the level of his knowledge concerning the use and processing of remote sensing data, and/or on the decision-making and/or action potential of the institution which he represents within the scope of the task to be fulfilled by the remote sensing data. A defined entry mask can allow the user to enter the requested information, this mask making it possible to enter precise or imprecise statements. The user can also state physically-based criteria (e.g., temporal and/or spatial resolution) for the use of the remote sensing data.

When a user profile is set up, the minimum of one physical data property of the remote sensing data can be assigned to the task profile data and to the user profile data. As a result, the minimum of one requirement on the use of remote sensing data is defined. If a user profile is not set up, the task profile can be assumed to be authoritative and serve as a basis for the determination of the result.

If desired, the user can define preferences with respect to the evaluation and selection problem. These preferences can be used in particular to define the influence which boundary conditions (e.g., cost of the use of the remote sensing data and data-processing products, data availability, preparation time, accuracy and quality of the data, degree to which a task profile defined by the user is fulfilled) can exert on the selection result.

The invention has the advantage that data which are suitable for a certain purpose can be selected automatically from the theoretically unlimited quantity of remote sensing data. No expert knowledge is required, because even information entered by inexperienced users leads to physically defined requirements on the use of the remote sensing data as a result of the assignment of physical data properties. In particular, the many satellites in space have many different types of sensors (e.g., with different temporal, spatial, and spectral resolutions). An automatic data processing system therefore can now search for data with properties corresponding to the requirements in, for example, one or more databases. Additional boundary conditions can also be taken into consideration (see above).

Remote sensing also has a multi-functional aspect, which the user cannot usually take into account fully or at all when selecting the remote sensing data. This multi-functionality aspect has the following components:

(a) multi-temporal sensing; that is, identical landscape objects are recorded at different times;

(b) multi-stationary and multi-sensor measurement; that is, the same objects are observed with different observation geometries (height of orbit/flyover, viewing/illumination angle of the satellite) and by different sensors (e.g., passive/active sensors);

(c) multi-spectral sensing; that is, objects are measured in different spectral regions (characteristic spectral signatures); and (d) multiple usability; that is, the same data are used to solve different problems and, in combination with data of other origins, to derive complex data.

The invention takes the multi-functionality aspect into account automatically. Let us assume that, when setting up the task profile, the user enters data from which it can be concluded that the remote sensing data are to be used to evaluate the properties of certain landscape objects (see point (a) above). The assignment of the physical data properties can therefore take into account automatically that a certain landscape object can be observed by the same satellite only at certain intervals in time and therefore only on a recurring basis (see point (b)).

Formulated more generally, an elaboration of the invention proposes that a physical model be implemented, which makes it possible to take into account the motion of the satellite relative to the surface of the planet (or other object) in the definition of the requirements. In particular, additional information concerning, for example, the orientation of the sensor of the satellite can be taken into account in the model. The input information required for the model are stored in a database, for example, and/or can be entered by the user.

The same applies to points (c) and (d) of the list above. In particular, it is possible to take into account the following aspects, either alternatively or additionally, when defining the requirements:

information on the various sensors in or on the same satellite, and the physical properties of the sensors by which the remote sensing data are recorded (e.g., spectral regions in which the sensor can detect radiation, spectral sensitivities of the sensors).

As follows from point (d), different tasks or even different task profiles can lead to the selection of the same remote sensing data and of the same processing routines. Two separate requirement profiles can therefore be similar or identical even though the tasks are different. In particular, it is therefore possible for the same physical properties to be assigned to many different tasks.

The invention can be used in particular as a consulting system, which helps the user to define precisely one or more of the following processes, which executes the one or more processes in whole or in part, or which prepares for such execution:

the problem-oriented selection of the remote sensing data;
the definition of requirements on the remote sensing with respect to spatial, temporal, spectral, and radiometric resolution;
navigation through the data inventories; and
the problem-oriented definition of the product (i.e., the definition of the result of further processing of the remote sensing data).

In a preferred embodiment of the invention, the requirements on the use of the remote sensing data generated from the task profile data are used to control the data processing of the remote sensing data. In particular, remote sensing data corresponding to the requirements are requested and downloaded from one or more databases, and the data processing of the downloaded data is controlled. In particular, at least one predefined processing routine can be selected on the basis of the requirements to process the remote sensing data. Additional embodiments of this type of control are also possible.

In particular, during the check which is run to determine whether or not the minimum of one requirement can be fulfilled, a requirement profile (containing the minimum of one requirement) and a service profile of the remote sensing data can be compared with each other. The service profile of the remote sensing data contains information on the services which the available remote sensing data can perform (today or in the future). In particular, the service profile and the requirement profile have the same types and/or numbers of categories of properties of the remote sensing data, so that a pairwise comparison can be made between the properties filed in the corresponding categories.

The requirement profile and the service profile both have, for example, the following categories:
a research field—the remote sensing data are to be used for an activity in a certain research field;
the geometric resolution of the remote sensing data;
the temporal resolution of the remote sensing data;
the radiometric resolution of the remote sensing data;
the spectral resolution of the remote sensing data;
optionally: a location and/or a territory to be evaluated on the basis of the remote sensing data;
one or more boundary conditions (e.g., price of the use of the remote sensing data).

The service profile can be stored in one or more databases, for example. The service profile itself can accordingly be interpreted as a property of a set of remote sensing data or of a remote sensing data processing system. A "remote sensing data processing system" is understood to be a set of remote sensing data and the associated processing routines which can process the remote sensing data into a defined product. The set of service profiles describes the possibilities which exist for fulfilling the imposed requirements.

When the requirement profile and the service profile are compared with each other, the similarity of (or distance between) the requirement profile and the service profile reveals the degree of fulfillment. The comparison makes it possible to evaluate the differences between the compared profiles. Differences and agreements in the individual categories can be weighted in different ways. In particular, user preferences and/or weightings defined by the user are used for the weighting. The differences are plotted by category on a numerical scale in accordance with the weighting. A numerical value is shown for each evaluated category, and the sum of the numerical values thus found represents the overall result of the comparison. In this way, an evaluation parameter is obtained.

In addition to the degree of fulfillment, it is also possible for other boundary conditions (e.g., cost of using the remote sensing data) to enter into the evaluation of the available remote sensing data or remote sensing data processing systems. The values belonging to these boundary conditions can be properties of alternative remote sensing data or remote sensing systems and are accessible together with the data properties. The boundary conditions which can enter into the evaluation can be predefined.

Both precise (e.g., defined by a numerical value) and imprecise (e.g., requirement defined by a term such as "high resolution" or "low resolution") data can enter into the evaluation, especially in the case of the boundary conditions but also in the case of the tasks of the task profile data. In particular, all of the imprecise data can first be converted to precise data, and then the evaluation can be performed. Alternatively, a so-called "fuzzy logic" evaluation method can be used. An example will be discussed on the basis of the attached figures.

In particular, the degree of agreement between one of the requirements (in the requirement profile) and one of the properties (in the service profile) can be determined in the following manner: A mathematical function (element) is assigned to each of the possible requirements in at least one of the categories, and a score is assigned by each of the functions to each of the possible properties in the service profile. When a concrete requirement has been formulated and it is then compared with a property in the service profile, the degree of agreement is determined by obtaining the score assigned by the function; this score represents the degree of agreement. Requirements formulated in an imprecise manner will result in a non-zero degree of agreement for each of a plurality of different properties.

The automation of the comparison between the service profile and the requirement profile makes it possible to compare the requirement profile with many different service profiles. Therefore, there is theoretically no limit on the number of services profiles which can be compared for their agreement with the requirement profile. The degree of their agreement can also be determined, so that it is possible to find the service profile with the highest degree of agreement with the requirement profile. Thus, for example, all of the available alternatives can be ranked.

In addition, an arrangement for selecting remote sensing data, especially remote sensing data recorded by a satellite, is proposed, which comprises the following elements:
an interface for the input of task profile data to define the tasks and/or goals which the use of the remote sensing data is intended to achieve;
an assigning unit, which is connected to the interface and which is designed to assign automatically at least one physical data property, especially a resolution, of the remote sensing data to the task profile data, so that at least one requirement on the use of the remote sensing data is defined;
a checking unit, which is designed to check the data properties of the available remote sensing data against the minimum of one requirement;
a determination unit, which is designed to determine whether and/or to what degree the minimum of one requirement can be fulfilled by the available remote sensing data; and
an output unit, which is designed to make available automatically the result of the determination.

The invention also comprises a computer program for selecting remote sensing data, where the means of the computer program in terms of program code are designed to execute the inventive method in at least one of its embodiments. In particular, the program code means can be stored on a computer-readable data storage medium. The invention also comprises a data storage medium and/or a computer system on which a data structure is stored, which, after it has been loaded into a working and/or main memory of a computer or computer network, executes the computer program.

According to the third aspect of the invention, a method for the automatic processing of remote sensing data (especially remote sensing data recorded by a satellite) is proposed, where the remote sensing data are in the form of an image matrix in a satellite projection; and geographic data, which are in the form of a projection or a geographic representation deviating from the satellite projection, are assigned to the pixels of the image matrix.

An "image matrix" is understood to be a locally two-dimensional matrix with pixels, which are usually arranged in a rectangular matrix. That is, the pixels are arranged in a matrix of rows and columns.

The inventive method can be described as "inverse georeferencing", because, in contrast to conventional georeferencing, geographic data are assigned to the remote sensing data in the satellite projection. When "georeferencing" is mentioned in the following, inverse georeferencing is meant.

The geographic data are assigned in particular to geographic earth coordinates or contain these geographic earth coordinates. "Geographic earth coordinates" are understood to be the coordinates usually used for determining positions on the earth's surface, namely, geographic longitude and geographic latitude. The earth coordinates can be in the form of a cylindrical projection of the earth's surface, for example. Instead of the earth, the observed object can also be some other body in space (e.g., a planet).

It is therefore possible to use the matrix coordinates of the image matrix in the satellite projection to access the geographic data. In particular, the geographic data are assigned to the pixels of the image matrix in such a way that they can be called up by the use of the image coordinates (e.g., line number and column number) of the image matrix.

The geographic information can be topographic information.

The inventive georeferencing has the advantage that the data present in the satellite projection can be processed thematically in parallel with the georeferencing. The processed data are also present in the satellite projection. The georeferencing (i.e., the actual assignment of the geographic data) can also be performed in whole or in part after the further processing. In contrast to the known procedures described above, therefore, sequential data processing beginning with georeferencing is not mandatory. The remote sensing data present in the satellite projection are also understood to include such additionally processed data.

It is also possible to control the use of data processors of various sensitivities for the further processing of the data present in the satellite projection. "Processors" are understood to be processing units with defined data processing functions. For example, a processor used to detect haze over water can have a sensitivity different from that of a processor for detecting haze over land.

Another advantage of the invention is that the number of pixels of the image matrix does not have to be increased for the sake of the georeferencing. In particular, the only data which must be assigned to each pixel in the satellite projection are that pixel's geographic coordinates. Optionally, additional geographic data can be assigned to each pixel, such as a grayscale value, which contains information on the relationships present at the assigned geographic point (e.g., height above sea level, that is, topographic information). These two data assignments, however, do not increase the number of lines and columns of the image matrix. In contrast, traditional georeferencing includes operations in which the original image matrix is rotated. It is therefore necessary to store and to process an image matrix of correspondingly larger size in which certain ranges of pixels contain no image information. Automatic processing makes it possible to handle large sets of data, especially because the remote sensing data are stored in a completely allocated image matrix with a given number of rows and columns.

In particular, the inventive georeferencing can be part of a method for subjecting sets of remote sensing data to automatic quality control while they are being processed, for example. In particular, it is possible to evaluate the different starting situations which were present when the remote sensing data were recorded. In an elaboration of the invention, the georeferencing is done first (e.g., on the basis of the cloud-free land and water surfaces in the image area), and then the quality level (e.g., information content) of the image data obtained is evaluated. It can be important, for example, to evaluate the actual land-water distribution of the area covered by the image matrix. If the area covered is under a thick layer of clouds, it can be very difficult a priori to estimate the distribution. Thus the usability of the data for a certain purpose can be determined and/or evaluated.

Quality evaluation or some other type of processing, however, can also be carried out at a reduced level of image resolution, that is, with a reduced number of pixels.

In an elaboration of the invention, the geographic coordinates corresponding to a large number of pixels of the image matrix are determined from the geographic data to define an observation area covered by the image matrix. In addition, the geographic data corresponding to the defined observation area are transformed, so that the sets of corresponding geographic data and the associated pixels of the image matrix in the defined observation area are assigned to each other. In particular, the transformation of the geographic data can take into account the relative motion between the satellite and an observed body in space.

When a receiving station on the ground receives the signals recorded by the satellite, additional data, called "metadata", are usually generated also. In particular, the time at which the signals were recorded by the sensor of the satellite and information concerning the satellite's orbit (orbit data) are used to produce the metadata. Thus the corner coordinates (e.g., in the coordinate system of the observed body in space) of an image taken by the satellite and/or coordinates of other pixels can be calculated. As a result of unforeseeable orbital deviations (e.g., because of density fluctuations in the atmosphere of the space body), however, these coordinates frequently contain errors.

In an embodiment of the inventive method, the coordinates present in (and/or calculated from) the metadata can be used to generate data automatically (e.g., by means of suitable software) for a geographic map of suitable size and type. In particular, the outer frame of the area covered by the remote sensing data (area of the image matrix in the satellite projection) can be identified. Especially in cases where the geographic coordinates are determined from the metadata (but also in other cases), the geographic (especially topographic) information can be transferred to the satellite data on the basis of the coordinates of the satellite's orbit, provided that, for example, the altitude of the satellite, the geometry of the satellite's sensor, and the lenses used to record the data, are known. Necessary transformation parameters can be derived from the map, and/or the rotational movement of the space body during the flyover of the satellite can be taken into account.

It should be mentioned here that the information contained in the metadata is usually based on preliminary calculations (using so-called two-line elements).

The result of the transformation can then be used to evaluate, for example, the relevance of the remote sensing data for the user. This is based on the assumption, however, that the coordinates taken from the metadata or determined from them, for example, are correct and/or that any errors have been identified and corrected. Errors can be identified by comparing the satellite image with, for example, a reference image. In the case of remote sensing data with high cloud coverage, however, this cannot be accomplished reliably in every case.

In an elaboration, therefore, corrected data concerning the relative motion between the satellite and the observed space body are used.

Such corrected data are usually based on measurements of the actual relative position of the satellite at defined times (e.g., by the use of a satellite-based position-determining system such as GPS or Galileo) and on subsequent correction of the previously expected orbital motion or on subsequent determination of the orbital motion. In particular, if it has been necessary to correct the transformed geographic data, the corrected data on the relative motion can then be used in turn to define an observed area covered by the image matrix and to transform the geographic data onto the image matrix.

For example, the corner coordinates of the defined observation area can be determined from the corrected data, and additional information concerning the relative motion can be taken into account. The additional information can be calculated from the following data, i.e., the following information can be taken into consideration: the equatorial crossing time of the orbit of the satellite, the equation of time, the small circles of the satellite's motion, rotational movement of the observed space body, properties of at least of one of the sensors used to record the image data contained in the image matrix (e.g., aperture angle of the covered area) and/or of the alignment and/or position of the sensor.

Because known geographic data are transferred into the satellite projection in the case of the previously described embodiment of the invention, the information content of the image matrix cannot be changed. Important for the quality of the georeferencing, therefore, is the accuracy with which the known geographic data are identified. If (as previously described) quality defects are found, they can be corrected by a procedure specifically designed to correct that particular type of error. Each procedure is associated with a different degree of effort. "Quality" (because it has to do with inverse georeferencing) means the accuracy with which the geographic data is assigned to the pixels of the image matrix in the satellite projection.

Highly precise data, however, are not usually available until several days after the satellite data have been received. A quality control procedure, which can also be called a data usability analysis and which evaluates the cloud cover, is used, for example, immediately after the data have been received. For this purpose, the appropriate image coordinates can be derived from the current reception parameters of the antenna, from the azimuth angle, from the elevation, and from the reception time (under consideration of the equatorial crossing time of the satellite and with the help of the equation of time) in order to check the information contained in the metadata for accuracy and possibly to correct it.

A reference image, for example, which is present initially in the (rectified) geographic coordinates of the assigned geographic data (that is, not yet in the satellite projection), can be used for quality control. Thus a second, redundant source of information is available, which makes quality control possible. The reference image is, for example, initially present in the standard coordinates (geographic longitude and geographic latitude) of the space body. It is then transformed into the satellite projection. Whether or not an error is present in the assignment of the geographic data to the pixels of the image matrix and/or how large the error is can be determined by correlating, for example, a structure in the reference image with the same structure in the image matrix and by determining the geographic position of the structure in both the reference image and the image matrix on the basis of the assigned geographic data. These structures can be linear structures, two-dimensional areas with defined boundaries, and/or point-like structures.

In addition, an arrangement for the automatic georeferencing of remote sensing data is proposed, which arrangement comprises the following:

a memory unit for storing remote sensing data present in the form of an image matrix in a satellite projection;

an assignment unit, which is connected to the memory unit and which is designed to assign geographic data, which are present in a projection or geographic representation deviating from the satellite projection, to the pixels of the image matrix.

The assignment unit can be designed to determine the appropriate geographic coordinates for a large number of pixels of the image matrix on the basis of the geographic data for the purpose of defining the observation area covered by the image matrix. In addition, the assignment unit is designed to assign geographic data to each of the pixels present in the observation area.

The assignment unit can have a transformation unit, which is designed to transform geographic data corresponding to a defined observation area under consideration of the motion data concerning the relative motion between the satellite and the space body, so that geographic data and the associated pixels of the image matrix are assigned to each other in a defined observation area.

The arrangement can have a comparison unit for comparing a first result of the assignment with a second result of the assignment, where the first result and the second result are based on geographic data acquired in different ways. This makes it possible in particular to compare the results. If the comparison shows that differences are present, the causes of the differences can be identified and/or errors can be corrected.

The arrangement can have a control unit, which is designed to assign structures in a reference image to corresponding structures of the image matrix, to determine the geographic positions of each of the corresponding structures, and to compare them. On that basis, the control unit then determines if any error has been made in the assignment of the geographic data to the pixels.

The invention also comprises a computer program for the automatic georeferencing of remote sensing data, where means of the computer program in terms of program code are designed to execute the inventive method in at least one of its embodiments. In particular, the program code means can be stored on a computer-readable data storage medium. The scope of the invention also includes a data storage medium and/or a computer system on which a data structure is stored, which, after being loaded into a working and/or a main memory of a computer or computer network, executes the computer program.

Features of the first, second, and third aspects of the invention can be combined with each other in any desired way. In particular, the first, second or third aspect of the invention can be provided independently of the other aspects (that is, without features of the other aspects) in a specific embodiment of the invention. Each of the aspects can therefore also be an independent invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are now described on the basis of the attached drawings. Any individual features or combinations of features of the exemplary embodiments can be combined with the previously described embodiments of the invention. Among the drawings:

FIG. 5 is a schematic diagram of the assignment of physical data properties to the task profile data;

FIG. 6A is a legend, which explains the numbers and abbreviations used in FIGS. 5 and 6;

FIGS. 15-19 shows maps which illustrate the transformation of geographic data into a satellite projection.

DETAILED DESCRIPTION OF THE PRESENTLY PREFERRED EMBODIMENTS

First Aspect of the Invention

Figure 1:
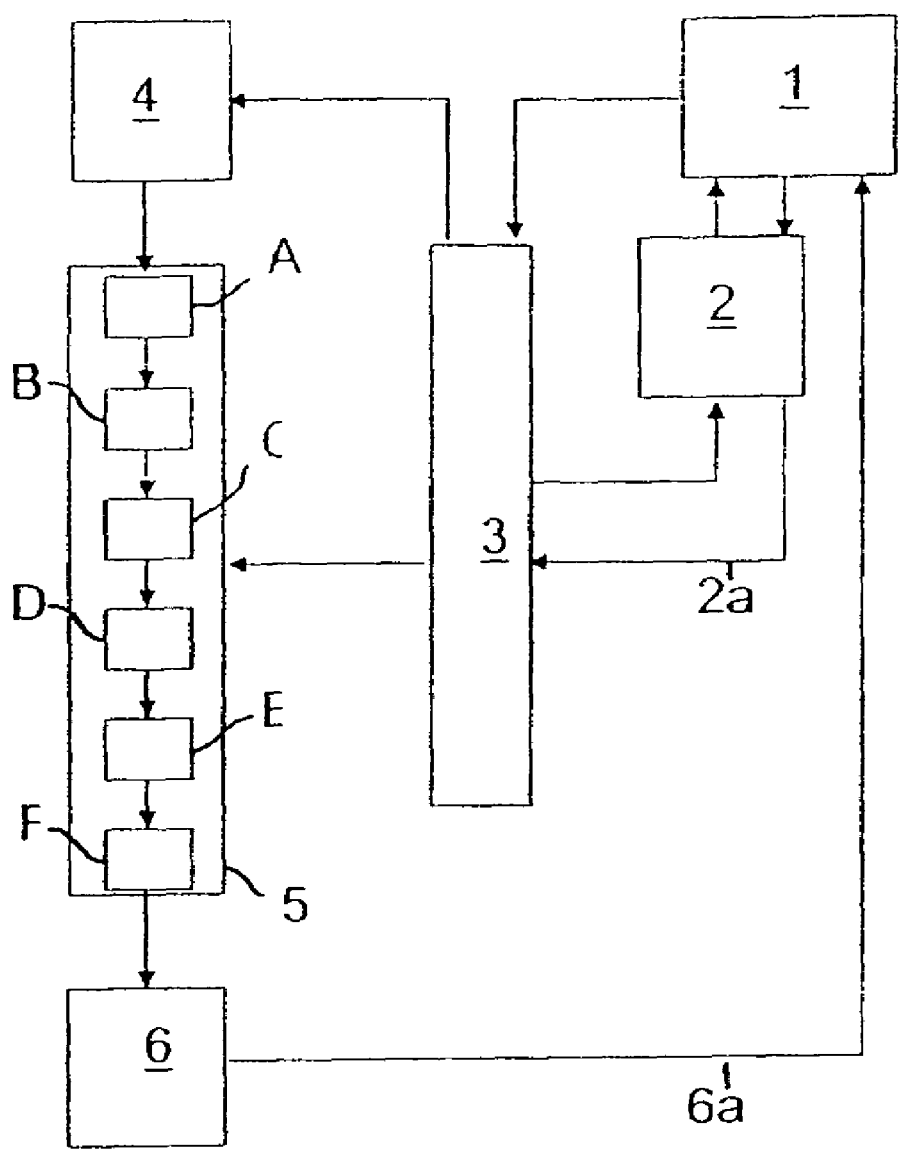
FIG. 1 shows a preferred arrangement with modules for processing remote sensing data.

In the arrangement shown in FIG. 1, a user is designated by the reference number 1. The user 1 can use the interface of a requirement generator 2 to enter information concerning the goals, tasks, and/or the research field associated with the use of the remote sensing data; information concerning himself; and/or information concerning boundary conditions (i.e., additional desires and specifications). On the basis of this entered information, the requirement generator 2 generates requirements on the use of the remote sensing data and makes them available as output via an interface 2a with a linker 3.

The entire arrangement, with the exception of the user 1, can be realized in the form of hardware and/or software.

The linker 3 receives the requirement profile via the interface 2a. The linker can also transfer data to the requirement generator 2 when it is determined by the linker 3 that, for example, a certain requirement cannot be fulfilled or can be fulfilled only partially. In this case, a message can be sent back to the user 1.

The arrangement also has a memory unit 4, which is connected to the linker 3. The remote sensing data are stored in the memory unit 4. Remote sensing data products, that is, the results obtained by processing the remote sensing data, can also be stored in the memory unit 4.

The memory unit 4 can also be a spatially distributed memory unit with several memory subunits, which are connected to each other in particular by a data transmission network (e.g., the Internet). The available processing routines, especially a large number of thematic processing routines, from which one or more are selected for each linkage of processing routines (e.g., to fulfill a concrete requirement profile), can also be stored in the distributed memory unit.

Figure 2:
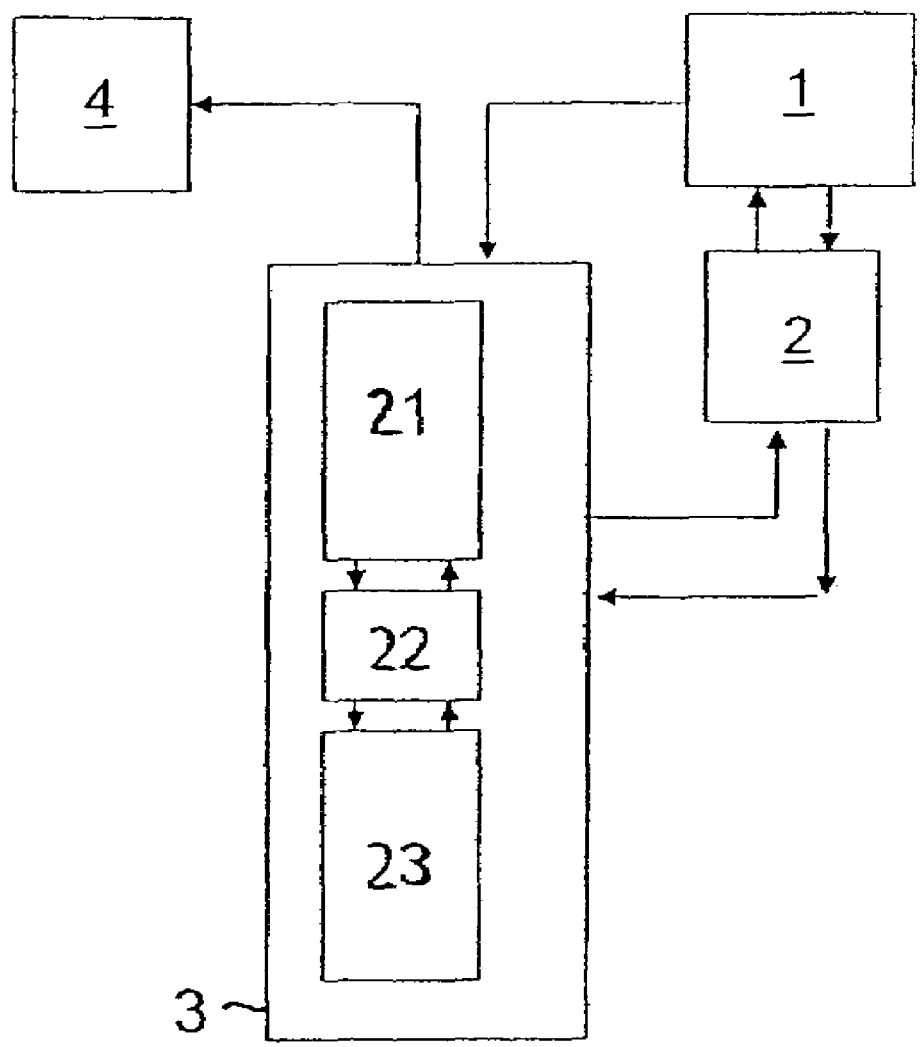
FIG. 2 shows a concrete exemplary embodiment of the linker 3 illustrated in FIG. 1.

In the exemplary embodiment, however, some or all of the processing routines are stored in a memory unit 22 (see FIG. 2) of the linker 3. The following information is also stored in the memory unit 22:

information which characterizes the satellites and/or sensors which acquire the remote sensing data;

information on the observed objects or observed areas (e.g., spectra, surface roughness), which can be obtained from the remote sensing data;

information on the processing routines; and information on the linking and/or use of the processing routines.

The linker 3 has in particular the task of evaluating the requirements so that processing routines can be linked together. The linker 3 processes the object-related properties (e.g., spectra or other properties of the data) first and then the information related to the acquisition of the remote sensing data (e.g., geometric, temporal, and radiometric resolution of the sensors). The requirement profile generated by the requirement generator 2 is transformed automatically by a transformer 21 (see FIG. 2), which is connected to the interface 2a, into a requirement profile with a plurality of technical requirements on the use of the remote sensing data.

The technical requirements include in particular the radiometric resolution, the temporal resolution, the spectral resolution, and the geographic resolution of the remote sensing data.

The transformer 21 also generates routine requirements, which are to be fulfilled by the selected individual processing routines. It transforms user requirements on the processing of the remote sensing data (e.g., "draw a map of a specific observation area in which zones with defined vegetation are visually recognizable") into technical requirements (e.g., defined input variables for processing routines and output variables of processing routines). For this purpose, the transformer 21 relies in particular on the previously mentioned information on the observed objects or observed areas, on the information concerning the processing routines, and on the information concerning the linking and/or uses of those routines in the memory unit 22. Real data inventories, that is, inventories which are currently available or which will be available in the future, are taken into consideration.

For example, it can be determined that the requirements cannot be fulfilled or can be fulfilled only partially. Formulated more generally, the linker 3 can be designed to check, on the basis of the real data inventories, to see whether the requirements can be fulfilled or not. This check can also be extended to the existing processing routines. It is therefore established whether or not it is possible to achieve the goal of processing the remote sensing data by the use of these processing routines. For example, an appropriate message to this effect can be sent back to the user, and the requirement profile can be revised by the input of new information.

Another arrow leaves the linker 3 in FIG. 1, this one proceeding to the left. In the present exemplary embodiment, this arrow leads to a linkage 5 of selected processing routines, which form a process chain. The arrow is meant to show that the linker 3 configures the linkage 5 in correspondence with the requirements obtained via the interface 2a; that is, it assembles the processing routines from among those that are available and links them together. For this purpose, the linker 3 has an evaluator 23 to evaluate the requirements which were transformed by the transformer 21 and which, for example, were stored in the memory unit 22. The evaluator 23 again relies on the previously mentioned data on the observed objects or observed areas, on the information concerning the processing routines, and on the information concerning their linkage and/or uses present in the memory unit 22.

Under certain conditions, it may be necessary for certain adaptations to be made to accommodate the interfaces of the processing routines. This job is also done by the evaluator 23. Configurations of this type can be performed by the linker not only in this exemplary embodiment but also in general. The linker 3 can also access the information stored in the memory unit 4.

In the case of simple data products, it can be sufficient under certain conditions for only a few processing routines to be linked together. In the case of complex products, however, a large number of processing routines will usually be required. The illustrated process chain consists of a total of six processing routines A-F, arranged in sequence from top to bottom in the processing direction of the data. Processing routine A acquires the data (especially raw data, that is, data generated directly by a sensor and unchanged with respect to its information content) required for processing directly from the memory unit 4. The last processing routine F in the sequence of the process chain makes the result of the processing available to an output device 6, which is connected by way of an interface 6a to the user 1. The invention is not limited, however, to a process chain with six processing routines. Depending on the task to be accomplished, the number of processing routines which can be linked together can be larger or smaller.

Processing routines A-C and F can be standard processing routines, namely:

a processing routine A for taking into account the sensitivity of the sensor which recorded the remote sensing data (so-called "calibration");

a processing routine B for correcting the influence of an atmosphere (where the routine processes the data as described in European Patent Application No. 1,091,188 A1 and/or as in the as-yet unpublished German Patent Application No. 10 2004 024 595.9);

a processing routine C for assigning geographic information to the remote sensing data (so-called georeferencing or rectification, as described, for example, in German Patent Application No. 103 54 752 A1); and a processing routine F for preparing the data for a geographic map, which presents the results of the processing.

Reference is herewith made to the entire contents of the publications and of the unpublished application cited above.

In the present example, processing routine D is a routine for identifying certain objects (e.g., defined surface regions such as areas with a certain kind of vegetation or water regions). A processing routine of this type processes the remote sensing data as described, for example, in German Patent Application No. 199 39 732 A1 and/or as described in German Patent Application No. 103 58 938.4 (not yet published), to the entire content of which reference is herewith made. If the routine requires additional data to achieve the goal of the data processing, it is considered a thematic processing routine. If the processing routine is a standard routine, the result is used to control the thematic processing routines. The configurations of these processing routines can thus be controlled, and thus the way in which the remote sensing data are processed can be changed. When this type of control is exercised, information on the geographic location of certain pixels of the remote sensing data in particular can be taken into account.

Processing routine E is a thematic processing routine, such as a routine for identifying the concentrations of certain substances participating in the chlorophyll cycle in water-covered areas. An example of a series of steps by which the processing routine can process the remote sensing data is given below:

the remote sensing data to be processed are read in;

additional information (e.g., characteristic spectra), which make it possible to identify the substances from the remote sensing data, are read in; the additional information can be transferred from the linker 3 and/or the memory unit 4 to the routine;

the substances are identified by the processing of the remote sensing data; and the substance concentrations are made available as output, e.g., as an image matrix, which can be assigned in processing routine F to geographic data.

Second Aspect of the Invention

Figure 3:
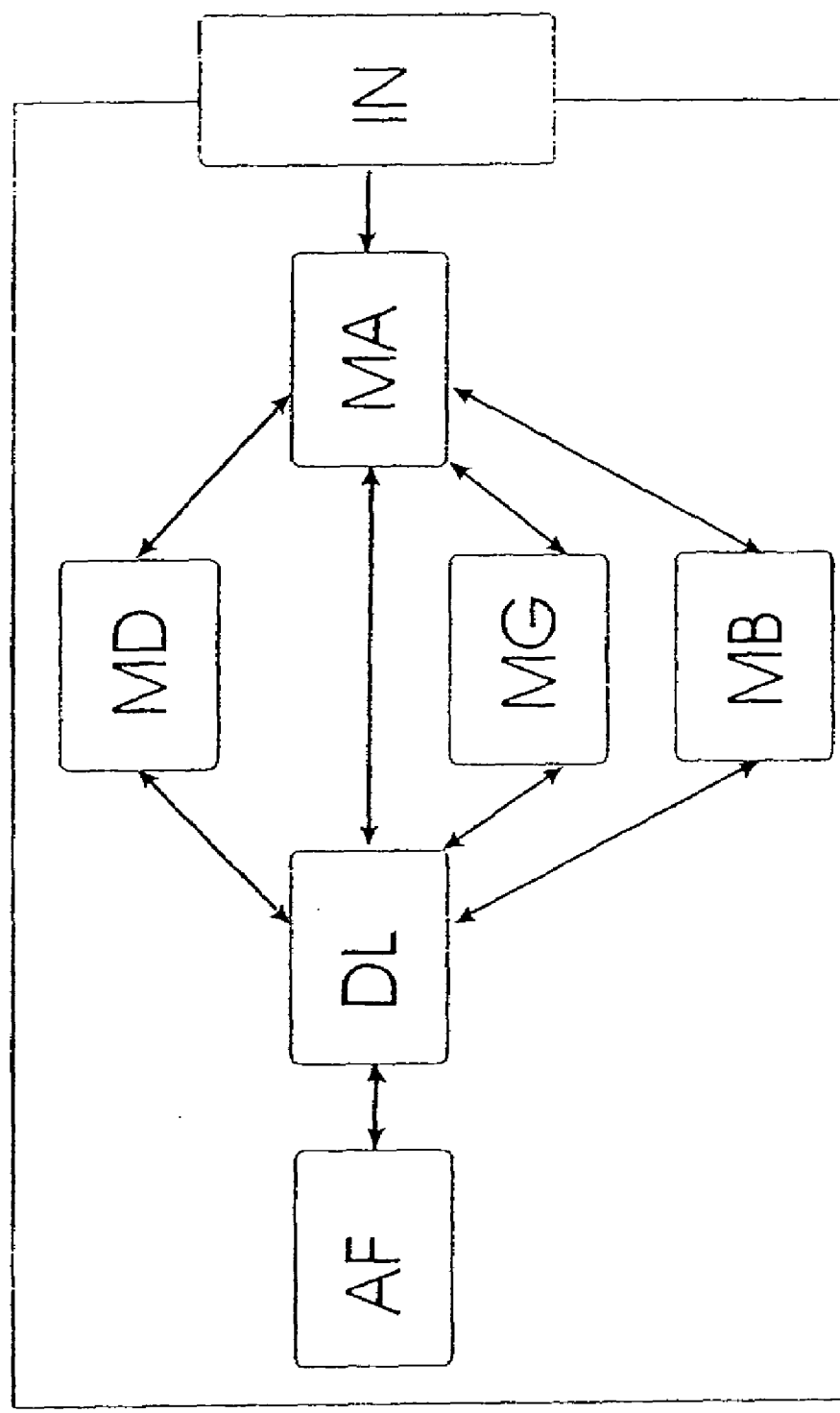
FIG. 3 shows a preferred arrangement for selecting remote sensing data according to a second aspect of the invention.

The arrangement shown in FIG. 3 has an interface IN for entering data and for making the results of the arrangement available as output. Via the interface IN, the user of the arrangement can enter information (e.g., by the use of a keyboard) and can be informed of the result (by display on a screen, for example, and/or by a printout from a printer). The information entered by the user is used in the arrangement especially to generate a task profile.

The interface IN is connected to an assignment unit/ assigner MA, which has the job of assigning physical data properties to the information entered by the user. The assigner MA is connected directly to a memory unit DL, and also indirectly to the memory unit DL by way of a checker MD, a weighter MG, and an evaluator MB. The memory unit DL can also be connected, if desired, to an archive AF.

The data properties of the remote sensing data and the processing routines for the processing of the remote sensing data in particular are stored in the memory unit DL. The remote sensing data themselves (to the extent present) are stored in the archive AF. Alternatively, a different memory structure can be used with, for example, only one memory unit, in which the data properties, the data themselves, and the processing routines are stored.

A preferred embodiment of the inventive method is described with reference to FIGS. 3 and 4.

On the basis of a series of statements, the user defines, via the interface IN, the tasks for which the remote sensing data are to be used. These statements pertain, for example, to the temporal-spatial dynamics of a phenomenon to be recorded. For this purpose, the interface IN can offer the user a mask which facilitates the input of the information and which makes it possible for him to enter imprecisely defined information.

In addition, the user can use the interface IN to enter information about himself, from which a user profile can be set up in the interface IN and/or in the assigner MA. Additional information for the user profile can also be acquired in various other ways, such as by accessing previously stored information on the user, which are present in the memory unit DL, for example. An individual user profile for a user can thus be assembled (e.g., interactively in dialog with the user) and stored; this profile will contain, for example, information on the preferred area of application of the remote sensing data, knowledge acquired from previous requests for information, geographic and/or temporal resolutions, and boundary conditions. Through the use of the stored user profile, criteria and data attributes can be preselected for the future.

If the user is experienced, however, it is also possible to dispense with the user profile. In this case, the user profile is deactivated either by the user, for example, or by the system. In this case, it is assumed that the task profile has been set up by an experienced user, and it will be taken into account accordingly in the selection of the remote sensing data.

The user himself can classify the information which he has entered under predefined criteria. For example, he can use the information concerning tasks to specify a temporal and/or spatial resolution of the remote sensing data to be used.

The user can also enter preferences via the interface IN, by means of which he determines the weightings to be used for the evaluation of the data during the selection process. In particular, the boundary conditions (such as the cost of using the remote sensing data, data availability, length of time it will take for the remote sensing data to become available, accuracy and/or quality of the data, minimum degree of fulfillment of the user-defined tasks by the selection result) can be weighted in this way.

In the assigner MA, the task profile and the user profile can be combined, and the physical data properties can be assigned, so that a requirement profile is generated. The requirement profile describes the requirements to be fulfilled by the remote sensing data processing system (or by the remote sensing data).

It is preferable to check the user's inputs for the task profile and the user profile for consistency, so that the arrangement can clarify any discrepancies interactively with the user and/or so that, if desired, a corrected task profile can be prepared.

The assigner MA preferably uses the inference method to produce the combination. Precise or imprecise values are processed in accordance with predefined rules, as will be explained below on the basis of an example and by reference to FIG. 9. The user enters information, for example, so that words can be defined as values of linguistic variables. The linguistic variables can then be represented by imprecise elements in the profiles, for example.

In a situation in which the rules are set up by an expert, the rules can be checked on the basis of examples (e.g., training scenarios) and under certain conditions adapted over the course of several iterations. For example, a neural network with a large number of neurally linked fuzzy-logic nodes can be used. This network must be trained and does not deliver a clearly defined result from the very beginning even when defined input data are used. If the user enters precisely formulated requirements, however, which allow no alternatives, the result is determined from the very beginning.

Now the checker MD will compare at least one service profile stored in the memory unit DL with the requirement profile prepared by the assigner MA. Many service profiles are preferably compared with the requirement profile. The set of service profiles describes the possibilities which exist for fulfilling the requirements. As the result of this comparison, the checker MD can, for example, send the message back to the user, via the assigner MA and the interface IN (or by means of some other interface), that the requirement can be fulfilled in whole or in part by the service profile. In particular, a degree of fulfillment is obtained from the similarity (distance) between the requirement profile and the service profile. It is also conceivable that an optimized solution derived from the service profiles could be returned (see the description of the evaluator MB below).

The weighter MG conducts a pairwise comparison (as previously described) of properties, for example, which are filed in corresponding categories of the profiles.

The evaluator MB examines and evaluates the service profile or the service profiles under consideration of the requirement profile. Not only the degree of fulfillment but also preferably the boundary conditions enter into the evaluation of the existing remote sensing data processing systems. For this purpose, the boundary conditions can be considered components of the profiles, so that, for example, one or more categories in the profiles will represent the boundary conditions. It can be permanently specified which boundary conditions are to enter into the evaluation. On the basis of the result of the evaluation, a ranking (according to the degree of agreement) of all the available service profiles, a ranking of the remote sensing data, or a ranking of the remote sensing data defined by a service profile can established.

By means of a hierarchical classification of the criteria, the complexity of the request for data is minimized, and a weighting of the criteria can be achieved.

Figure 7:
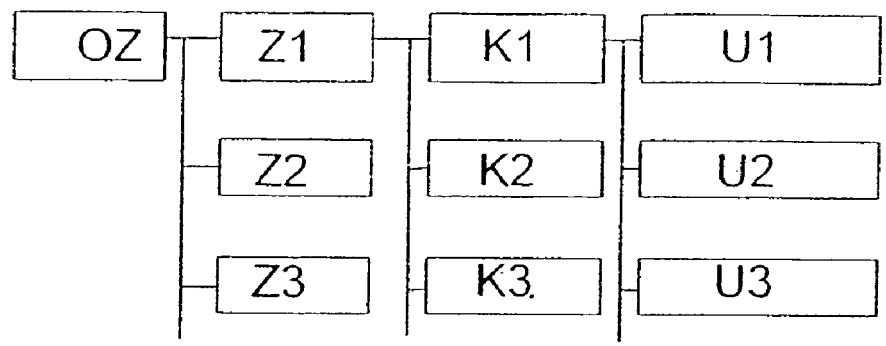
FIG. 7 is a diagram which represents a hierarchical classification of criteria.

The hierarchical classification of selection criteria can reduce the complexity of the data which must be entered by the user, and a weighting of the criteria can be achieved. The arrangement can access classifications of data properties which make it possible to assign the properties to the selection criteria. FIG. 7 shows an example of a hierarchical structure. The overall goal of the use of the data is represented by the block OZ. The overall goal can comprise one or more subgoals Z1, Z2, Z3, etc. For each of the subgoals Z1, Z2, Z3, etc., criteria K1, K2, K3, etc., are defined, for each of which in turn subcriteria U1, U2, U3, etc., are defined. This makes it possible for the user to state individual subcriteria, from which the overall goal can be derived. The results of the request for the subcriteria can then be combined, and an overall result can be established, which makes it possible to describe the overall goal. Weightings given to the criteria by the user can be taken into account.

By projecting the user's requirements onto a matrix (with matrix elements divided into rows and columns, called the "goal achievement matrix"), the requirements defined by the information entered by the user can, in a preferred embodiment, be processed mathematically. Evaluation of this matrix by the MADM method (Multiple Attribute Decision Making Method) makes it possible both to check for plausibility and to objectify the information request. The MADM method is described, for example, in H.-J. Zimmermann and L. Gutsche (1991): *Multi-Criteria Analysis—Introduction to the Theory of Decision Making with Multiple Goals*, Springer-Verlag, Berlin, Heidelberg, New York, London, Paris, Tokyo, Barcelona, Budapest, ISBN 3-540-54483-6 (Berlin), ISBN 0-387-54483-6 (New York). The full content of the parts of this publication describing the MADM method is hereby incorporated by reference.

By means of a goal achievement matrix (which has been checked in particular as described above for consistency of the information or criteria entered by the user), the arrangement can initiate a query to the memory unit DL, asking whether or not a corresponding service profile is present. The inventive solution presented here makes it possible to access remote sensing data more easily and represents a significant simplification of the search. Thus the existing data can also be utilized more effectively.

According to the MADM method, the criteria or properties defined in the requirement profile are compared with each other with respect to their (user-entered) weighting and with respect to the predefined goal. In particular, an eigenvector of the goal achievement matrix is obtained, and the consistency of the user-specified criteria is checked by the use of this eigenvector. The criteria can be corrected if desired. The goal can also be described in the form of a vector, the elements of which correspond to the criteria, so that, through a comparison of the eigenvector with the goal vector, a distance vector can be obtained. For example, the distance can be determined by finding the absolute value of the distance vector, and thus a measure is obtained for the degree to which the goal can be achieved by the criteria.

The application of the MADM method to set up and evaluate a goal achievement matrix facilitates the decision-making process and makes it possible to objectify the requirements by the application of expert knowledge. This expert knowledge, however, does not have to be in the user's possession; on the contrary, it has already entered the process. With the method, a higher degree of agreement is realized between the found data and the user's expectations. The described embodiment thus represents an interface with the data management system, which, on the basis of the MADM method, balances the specific requirement profile of the user as perfectly as possible against the properties which describe the data.

The arrangement can (e.g., ranked in accordance with the result of the evaluation) return as output the remote sensing data processing systems or remote sensing data most suitable for the established requirement profile and the specified boundary conditions. In addition, the user can be informed concerning possible deviations between the task profile and the requirement profile or selected service profile and/or concerning suitable alternatives.

If the arrangement has an archive AF, in which the remote sensing data are stored, the remote sensing data which best match the requirement profile are made available automatically as output and/or the most suitable processing routines are automatically called up. As a result, a processing order can be generated automatically and the remote sensing data processed automatically.

FIG. 5 shows an example of the assignment of physical data properties (here: the geometric resolution) to the task profile data (here: research fields or study problems for which the remote sensing data are to be used). In the figure, the thematic areas or study areas in the wide center column, labeled "Dimension", are assigned to geometric resolutions. The center column is subdivided into several smaller subcolumns. The geometric resolution of the remote sensing data is shown in the column on the right side of the figure labeled "pixel resolution". The numbers in this column are footnotes, each of which is assigned to a satellite and/or to a sensor of a satellite. The sensor or the satellite in question supplies remote sensing data with the geometric resolution indicated. If, for example, remote sensing data are required in the research field "environmental systems" in the area of "climatology" for the theme "site climate", remote sensing data with a suitable geometric resolution can be found by locating the footnote, here, for example, footnote 24 (satellite IKONOS with sensor "MS", that is multispectral) in the right column "Pixel Resolution" which is on the same horizontal level as the term "site climate". A suitable geometric resolution (namely, a better geometric resolution) is also supplied by all of the satellites or sensors with footnotes in the right column which are below the one just found.

If the user, therefore, enters "environmental systems" in the area of "climatology" with the theme "site climate" as his research field, a linear geometric resolution of 4 m and/or a two-dimensional geometric resolution of 10 m$^2$ is assigned to this information and entered into the requirement profile. These resolutions can be found in the "mapping" column in FIG. 5. In the column at the extreme left in the figure, various map scales corresponding to the geometric resolutions are entered logarithmically.

For the selection of suitable remote sensing data, both the geometric resolution of the remote sensing data and especially the temporal resolution of the data are important. The temporal resolution determines whether or not current data close in time to the observed process can realistically be acquired. In addition, the physical potential of the sensor for fulfilling the task can be checked and/or simulated.

Figure 6:
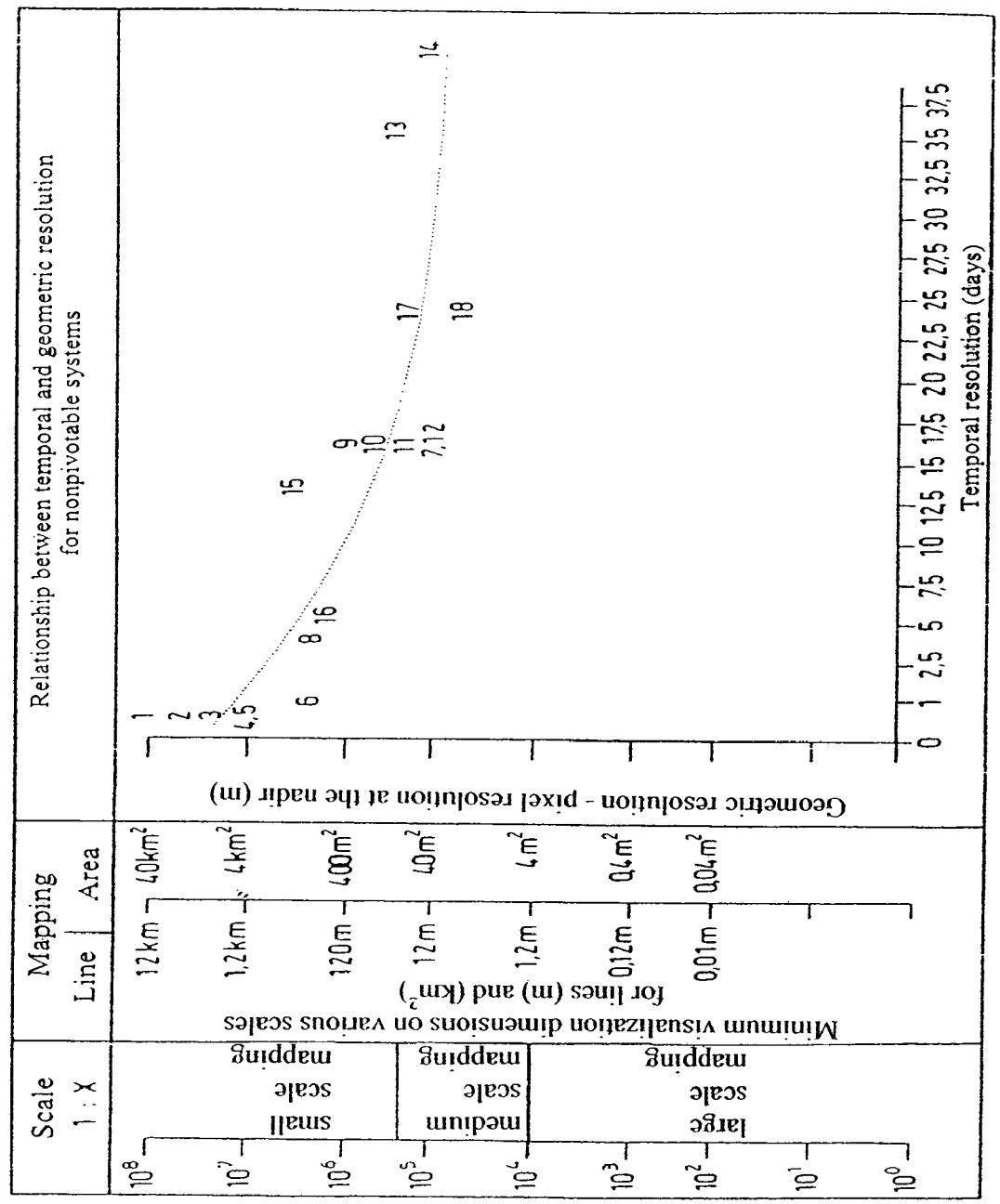
FIG. 6 shows a relationship between the geometric resolution of a satellite sensor and the temporal resolution (frequency) during the recording of the observed objects.

FIG. 6 shows the relationship between the geometric resolution of the sensors and the temporal availability of the data. For the sake of better understanding, it should be pointed out that a satellite returns to the same position with respect to a certain point on the earth's surface only after a certain time (period). Therefore, the same observation area can be observed again from the same angle only after this period. Nevertheless, it is possible that part of the observation area can be observed again by the satellite sooner, but from another viewing angle and/or as part of a different observation area.

FIG. 6 shows, on the horizontal axis, the periods of various satellites in days. The period is defined here as the temporal resolution. The numbers entered in the graph are again to be understood as footnotes, which refer to satellites or to the sensors of the satellites. The indication of the periods, however, does not exclude the possibility that, under certain conditions, the selection of the remote sensing data or of the remote sensing data processing systems can take into consideration the fact that part of an observation area can be observed again by the same sensor or satellite before the full period has been completed.

It can be seen from FIG. 6 that the geometric resolution achieved by the satellites or sensors are in an approximate functional relationship with the temporal resolution. This functional relationship is illustrated by the dotted line, which descends to smaller values for the geometric resolution as the period increases. That is, as the period gets longer, the geometric resolution becomes finer. This relationship is preferably also taken into account in the selection of the remote sensing data. In particular, on the basis of the relationship described above, it is possible to check the consistency of the information entered by the user. Discrepancies in this information can therefore be discovered; that is, it is possible to discover, for example, if the user has specified an unreasonably fine geometric resolution.

According to the previously described relationship, an increase in the spatial resolution (pixel resolution) usually results in a decrease in the width of the image strip of the earth's surface (swath) which can be scanned, so that a smaller area is covered. So that data covering the entire desired area can nevertheless be recorded, the satellite must complete a larger number of orbits. This inverse behavior of geometric and temporal resolution is illustrated by the dotted line. This problem with the inverse behavior of satellites can be bypassed under certain conditions by using data from different but comparable satellites (e.g., satellites with a sensor which supplies similar data). In the near future, several identical satellites will be launched simultaneously for this very purpose. Such constellations of satellites and the remote sensing data recorded by them can then be taken into account in the inventive method.

The columns "mapping" and "scale" are entered again in FIG. 6.

Figure 8:
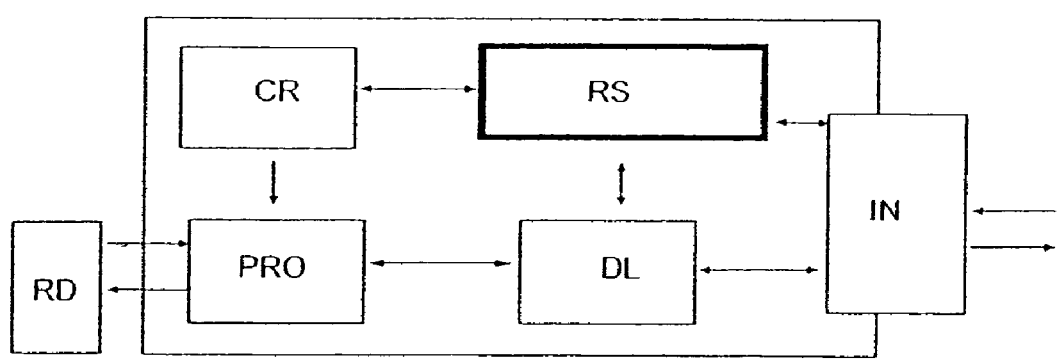
FIG. 8 shows an arrangement for processing remote sensing data, this arrangement containing in particular the arrangement shown in FIG. 3.

The arrangement shown in FIG. 8 for processing remote sensing data has, for example, the interface IN already shown in FIG. 3 and the memory unit DL shown in FIG. 3. RS designates a unit which can select additional remote sensing data or remote sensing data processing systems, as already described on the basis of FIG. 3. For example, the RS unit can comprise the assigner MA, the checker MD, the evaluator MB, and the weighter MG. A controller CR is also provided to control the processing of the remote sensing data and to control the selection of the remote sensing data or systems. The controller CR is connected to the RS unit and to an arrangement PRO for processing the remote sensing data. The arrangement PRO is connected in turn to an interface or memory unit RD, from which the arrangement PRO obtains the raw remote sensing data for further processing.

Figure 4:
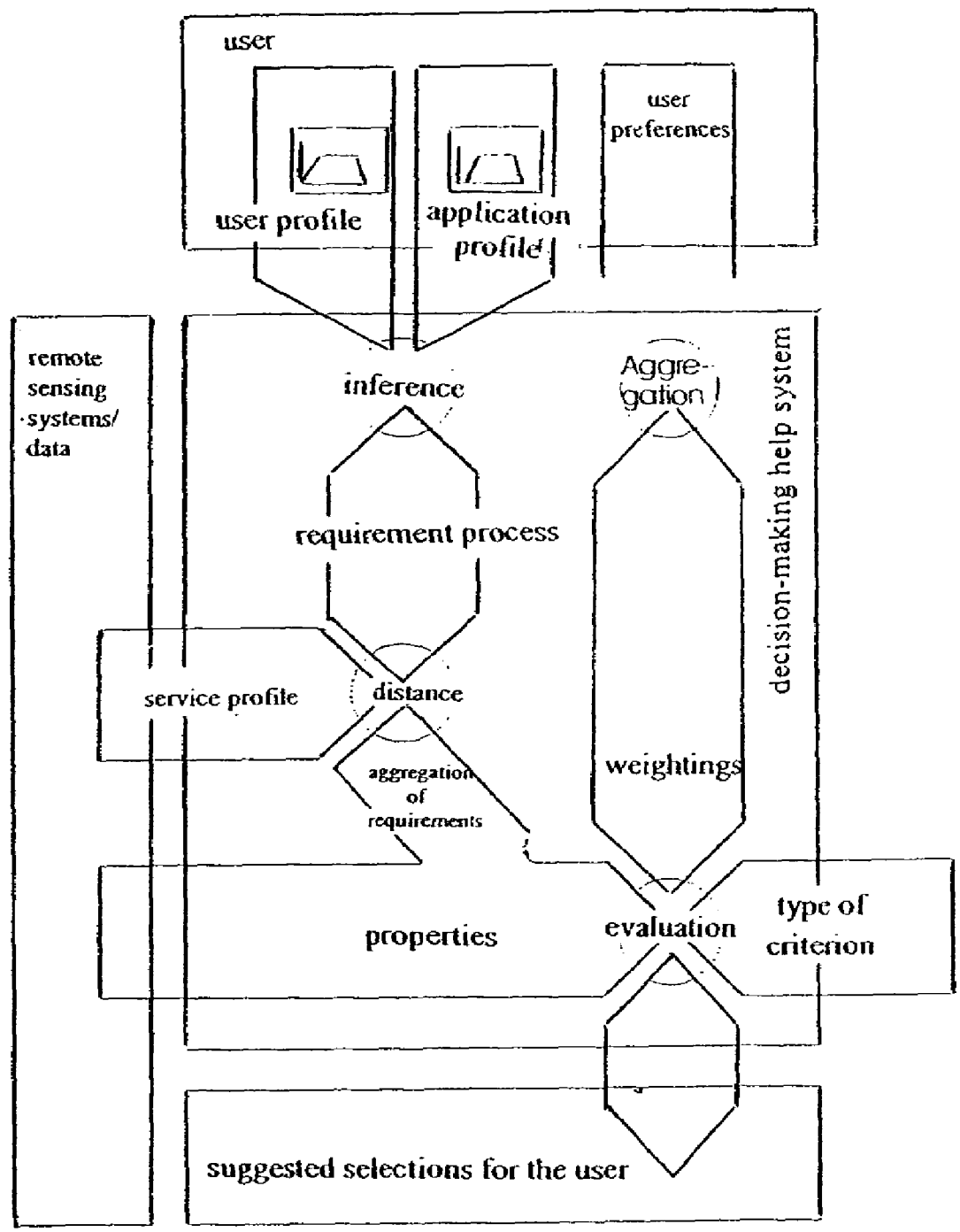
FIG. 4 is a flow chart which illustrates a preferred embodiment of the inventive method according to the second aspect of the invention.

During the operation of the overall arrangement shown in FIG. 8, the first step is the selection of a remote sensing data processing system, as already described, for example, on the basis of FIGS. 3 and 4. Information on this selection is transmitted from the unit RS to the controller CR. The selected service profile can also be transferred from the memory unit DL to the arrangement PRO. The controller CR controls the operation of the arrangement PRO in such a way that the remote sensing data are processed by the arrangement PRO according to the selected remote sensing data processing system. The arrangement PRO can request appropriate raw data from the interface or from the memory unit RD. In particular, the arrangement PRO has a chain of processing routines for processing the raw data, where the processing routines already existing beforehand are combined with each other in accordance with the selected remote sensing data processing system.

As already described, imprecise properties of the data and/or imprecise boundary conditions (e.g., the price of using the remote sensing data) can also be taken into account in the evaluation of the available remote sensing data or remote sensing data processing systems. In one form of the evaluation, a so-called "fuzzy" evaluation method by means of "fuzzy logic" can be used.

In fuzzy logic, linguistic variables are used as input variables. These are variables whose values are not numbers (as in the case of deterministic variables) or statistical distributions (as in the case of random variables), but rather language or linguistic constructions (also called "terms"). These terms are assigned to imprecise elements of a set of elements and/or represented by these elements. The elements can also be referred to as fuzzy value functions of a base variable.

An exemplary embodiment is now to be described on the basis of the boundary condition "price". It can be transferred to other base variables, namely, to other boundary conditions and/or physical properties of the remote sensing data. If a physical property is involved (e.g., the geometric resolution), a value range (20-40 m) or an imprecise statement (e.g., again a linguistic value such as "high resolution") can be assigned as the requirement even if the user enters a precise value (e.g., 30 m). A certain "fuzziness" is therefore generated, which offers the advantage that even properties in the service profile which deviate from a precise value (e.g., 40 m) will lead to the fulfillment, at least to a certain degree, of the requirement.

Figure 9:
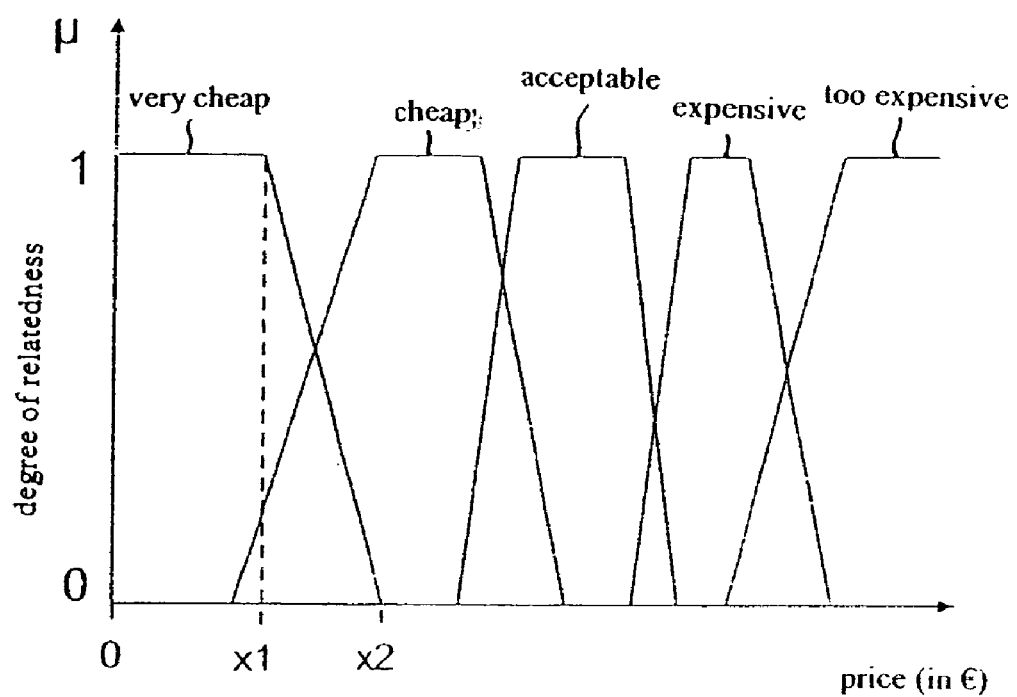
FIG. 9 shows a set of functions with which an imprecisely formulated requirement can be checked for agreement with a precisely defined property.

In the exemplary embodiment, the base variable "price" has five imprecise elements, which describe mathematically the degree of relatedness $\mu$ of a linguistic price statement (see, for example, FIG. 9: "very cheap", "cheap", "acceptable", "expensive", "too expensive"). Each of these elements is a function, which describes the degree to which the individual linguistic statement is related to values on a price scale.

Each element has a constant value of 1 over a certain range of values on the price scale. The elements decrease continuously (e.g., linearly) from this value 1 to zero. The boundary elements (in FIG. 9: "very cheap" and "too expensive") decrease continuously to zero on only one side, whereas the intermediate elements decrease continuously to zero on both sides. The value range with the value 1 and the steady (i.e., continuous) decrease express the imprecision of the relatedness of a price statement to a price. None of the elements overlaps any other element, so that the value range of the two elements in the overlap region has the value of 1. In other embodiments of the method, however, this can be the case.

When the user enters the linguistic statement "very cheap", the corresponding element is selected as a property of the price for the requirement profile. If now, upon comparison, a certain price in the service profile matches up with the property, it is possible to determine the degree of relatedness for this price by examining the element and to interpret the relatedness value as a weighting. If the degree of relatedness is 1 (for the price range from 0 to x1 in the example of FIG. 9), complete agreement is present. In the range of a continuously decreasing or a continuously increasing degree of relatedness, the degree of relatedness is between 0 and 1 (for the range from x1 to x2 in the example of FIG. 9). For a price in this range, the agreement is therefore evaluated with a degree of relatedness between 0 and 1. Where the price has a degree of relatedness of 0, there is no agreement, and therefore the requirement is not fulfilled.

The elements can be predefined and/or properties of the elements can be entered by the user. The elements do not have to have constant value ranges of the degree of relatedness (as shown in FIG. 9). Any other configuration of the elements is possible, but preferably it assigns a degree of relatedness (i.e., the weighting) uniquely to each value of the base variable.

Figure 10:
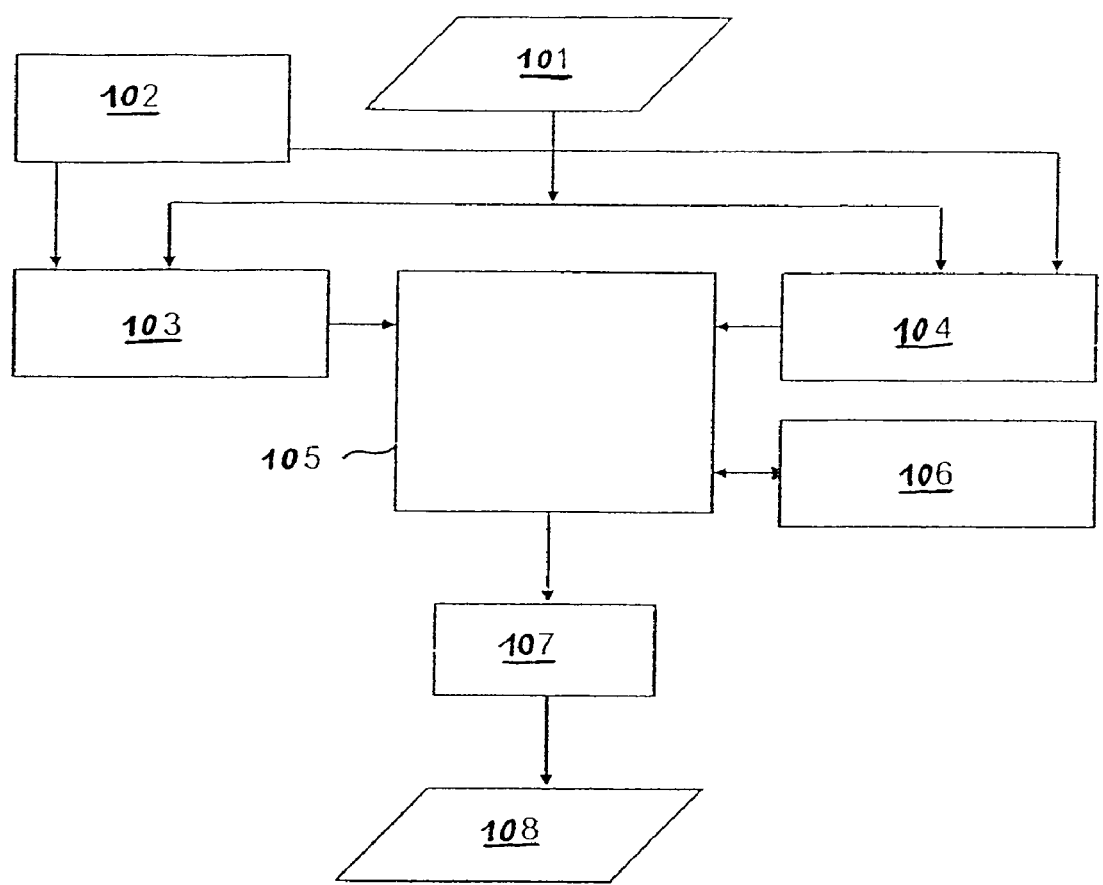
FIG. 10 shows a preferred exemplary embodiment of the inventive arrangement according to the third aspect of the invention.

The arrangement shown in FIG. 10 has an interface 101 for the input of data, which is connected to a first assigner 103 and to a second assigner 104. On the input side, the assigners 103, 104 are connected to a memory unit 102 for the storage of remote sensing data. On the output side, the assigners 103, 104 are connected to a comparator 105, which is connected in turn to a corrector 106. On the output side, the comparator 105 is connected optionally to a mapper 107 for preparing a geographic map in the satellite projection. The comparator or the mapper 107, if present, is connected to a second interface 108 for the output of the data.

Third Aspect of the Invention

The diagram of FIG. 10 can also be considered a flow chart, which represents the sequence of steps involved in georeferencing. One or more of the previously described units (e.g., all units with the reference numbers 103-106) can be realized in the form of hardware or software. In particular, the assigners 103, 104 do not have to be realized as separate units but rather can be, for example, software modules, which differ in particular only in that they process different geographic information as input data.

The arrangement for automatic georeferencing can be constructed in modular fashion in correspondence with the example described above, where each module corresponds to one of the units. Units 103-105 form the core of the arrangement. Information concerning the relative motion between the satellite and the observed space body, additional information, and/or geographic data derived therefrom can be available at the interface 101. The geographic data, which does not have to derived until later from the information made available at the interface 101, use conventional geographic coordinates to define an observation area covered by the image matrix. For example, the geographic data available at the interface 101 include the corner coordinates and/or the center or focal point coordinates of the observation area. The geographic data can originate from one or more sources, e.g., from metadata or from subsequently corrected motion data of the satellite. Thus various sets of geographic data can be present, which differ from each other.

The remote sensing data in the satellite projection and the geographic data are stored in the memory unit 102. Supplemental information, which is established a priority and which can be used for georeferencing, is also stored there. In particular, this supplemental information may include the corner coordinates, obtained via the interface 101, which are necessary for the transformation of the geographic data into the satellite projection. For example, the supplemental information may contain statements concerning the size of the observation area (e.g., the swath width) covered by the image matrix, concerning the local resolution of the pixels at the nadir, and concerning the position and/or orientation of the satellite or of the sensor relative to the observed space body. Instead of just a single memory unit 102, however, it is also possible to provide several memory units, so that the various types of data can be stored separately from each other.

In the assigner 103, the geographic data (e.g., map data) are transformed into the satellite projection with the use of the above-mentioned geographic data from a first source (e.g., corner coordinates from the metadata). As previously mentioned, the expected relative motion, however, can deviate from the actual relative motion. In the assigner 104, therefore, another transformation is carried out (in the same way, for example), but the geographic data which are used for this other transformation come from a second source (e.g., corner coordinates from an actual orbit of the satellite. One reason for the use of a second source of information is that, in an unfavorable case, the coordinates determined from the metadata can be wrong, e.g., they can be completely outside the actual observation area. On the other hand, in many cases one does not necessarily want to wait for the geographic data from the second source but wants rather to process the data on a so-called "near-real-time" basis.

In the assigners 103, 104, algorithms are implemented to determine the observation area and to assign the geographic data correctly to a large number of pixels of the image matrix. For example, each pixel can be assigned its geographic longitude, its geographic latitude, and additional map data (e.g., topographic data).

In the comparator 105, the results of the georeferencings performed in the two assigners 103, 104 are compared with each other. Alternatively, only one assigner can be provided, and the comparator will then compare the result of the completed georeferencing with a reference image. A structural analysis can also be made, which will be discussed further below. The comparator 105, however, can also compare the results of both assigners 103, 104 with the reference image.

A comparison with a reference image offers the advantage that the information present in the image matrix can be checked immediately to see whether or not the geographic data have been assigned correctly. Any position errors can be corrected by the optional corrector 106. The image matrix with correctly assigned geographic data is therefore available at the output of the comparator 105.

Figure 11:
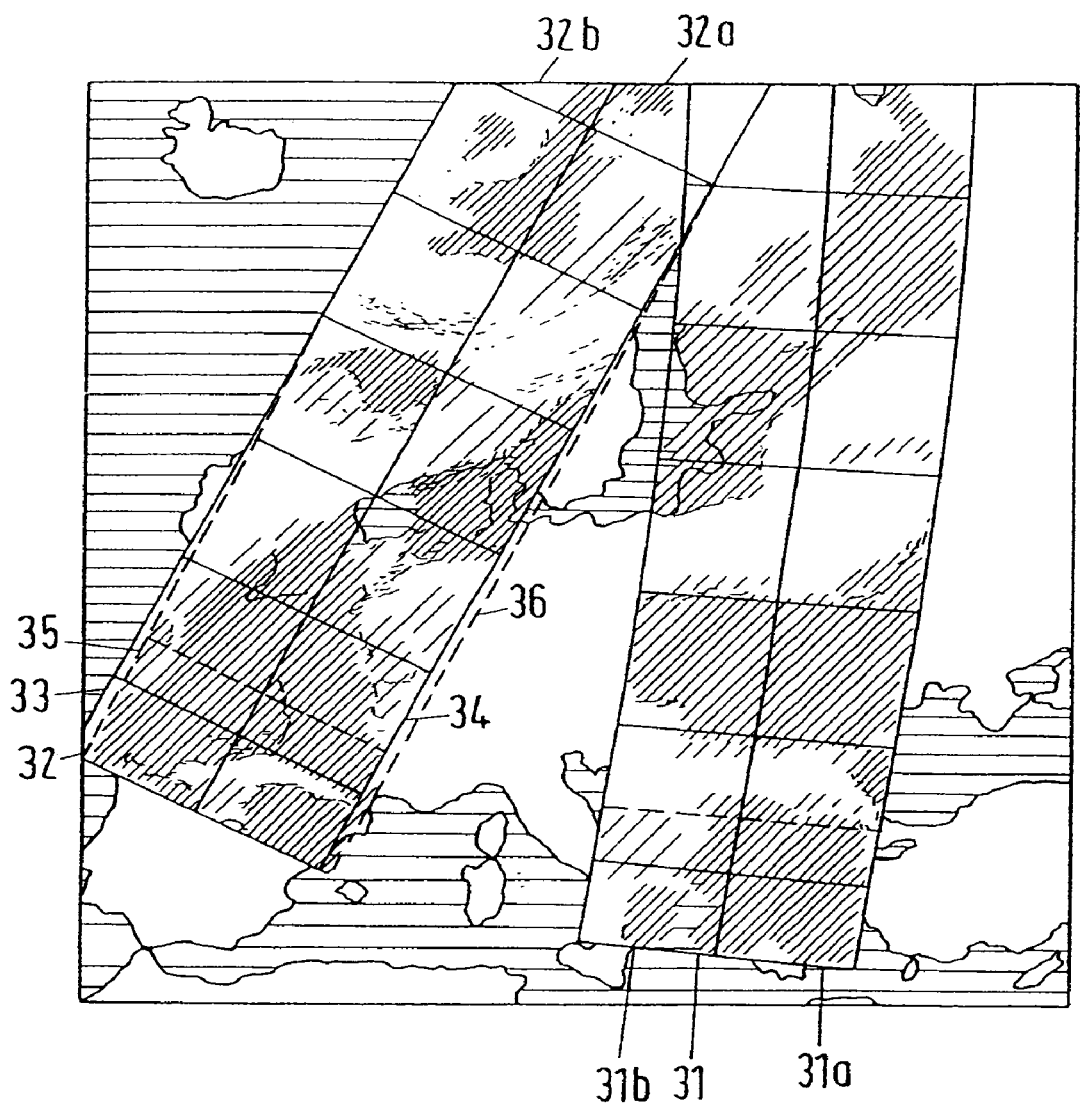
FIG. 11 shows observation areas of two different flyovers of a satellite.

FIG. 11 shows the optical data from two different flyovers of a satellite over the European continent. Highly precise coordinates obtained subsequently were used to correlate the geographic data. Land surfaces are shown in white with black boundaries. Superimposed on it are the two observation strips 31, 32, each consisting of two sub-strips 31a, 31b; 32a, 32b, which are subdivided yet again into individual "scenes" (areas with roughly rectangular frames). The further processing of the satellite data proceeds in correspondence with these subdivisions. The strips are divided beforehand (e.g., by means of previously executed calculations) or while the highly precise coordinates are being used to enter the satellite data into the map. In the most favorable case, the subdivision completely covers the observation strip (such as observation strip 31 in FIG. 11). Complete coverage would guarantee that the individual image matrices have been or are linked with the correct geographic data. In the case of the observation strip 32 on the left, however, it can be seen that the southern boundary lines 33, 34 determined from previous calculations are shifted increasingly toward the west with respect to the actual positions (broken lines 35, 36). As a result, the geographic data are assigned incorrectly to the recorded image data in the satellite projection. The incorrect assignment is based on coordinates which were acquired from the metadata.

Next, the mapper 107 can generate the data required for the output of a geographic map in the satellite projection, e.g., an image matrix with additional geographic structures such as coastlines and/or contour lines.

The various results of the assigners 103, 104, additional intermediate results, and/or the final results of the assignment can be stored in the memory unit 102 and/or in some other memory unit and read out again as needed.

As its end result, the method supplies data in the satellite projection.

The quality with which the geographic data are assigned to the pixels can be controlled in the following way, for example:

The parts of the observation area covered by the image matrix which are obscured by clouds and/or the homogeneous areas which emit a more-or-less constant radiation spectrum over the course of a season (e.g., areas of water and areas with coniferous forests) are identified first (e.g., by the use of a classification algorithm known in and of itself.

Figure 12:
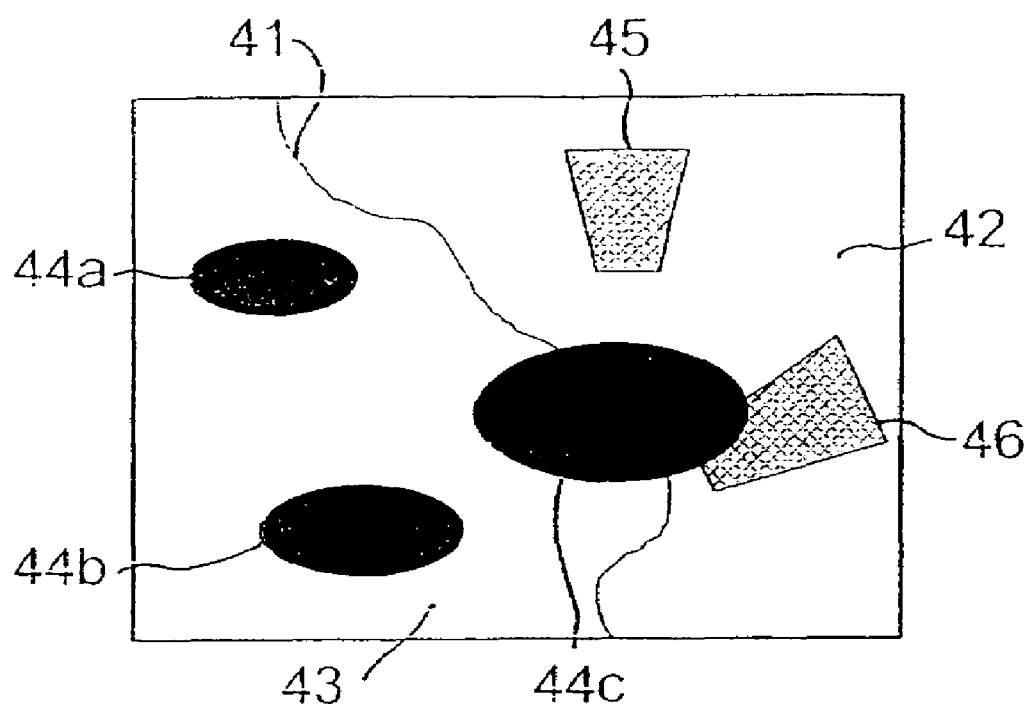
FIG. 12 is a schematic diagram of a scene in an image matrix in satellite projection.

FIG. 12 shows a schematic diagram of a scene (e.g., from an individual image matrix in satellite projection) with a coastline 41. On the right (to the east) of the coastline 41 there is a land surface 42. On the left (to the west) of the coastline 41 there is a water surface 43. Parts of the scene are obscured by clouds 44a, 44b, 44c, shown as black areas, during the observation by the satellite. Two defined subareas of the scene are designated by the reference numbers 45, 46. Cloud 44c partially covers area 46.

When cloud areas (e.g., the clouds 44a-44c) are identified, they are excluded from further processing (e.g., after preparation of a cloud mask) during quality control (e.g., a structural analysis) and/or are processed separately. Alternatively or in addition to the homogeneous areas, other structures (e.g., linear structures produced by mountain ridges and/or the coastline 41) can also be used.

In a special embodiment of the structural analysis, the edges of the homogeneous areas (e.g., the areas 45, 46) with a constant radiation spectrum are determined. In a preferred embodiment, an area is characterized separately if it is next to a cloud (area 46 in the example). On the basis of their edges, the homogeneous areas are then subjected to a structural analysis. As a result, a suitable structure index is determined, which characterizes the structure of the area on the basis of its edges. In particular, the edges can be described by the methods, known in and of themselves, of vector graphics (e.g., as described in Haberäcker, Peter (1995): *Practice of Digital Image Processing and Pattern Recognition*, Munich, Vienna, Hanser, 1995 (ISBN 3-446-15517-1), the entire content of which reference is hereby incorporated by reference). For example, each pixel on the edge is assigned a vector element, which points in the direction of the next pixel on the edge. Now it is possible to establish agreements and differences between the vectors of the edges or structures of the reference image and those of the image matrix. For each comparison of two vectors, one obtains a statement as to whether or not the edges or structures are the same. A large number of different vector pairs from the reference image and the image matrix can therefore be compared in this way. Information is also available concerning the geographic positions of the edges or structures, which means that, for two edges or structures which have been recognized as the same, it is possible to establish whether or not their positions are the same. Evaluating a large number of edges or structures in the two images makes it possible to arrive at a reliable statistical statement concerning whether or not the geographic positions and/or orientations of the images are different. If necessary, a correction can be made in the assignment of the geographic data to the pixels of the image matrix.

A corresponding structural analysis can be conducted with the use of a (preferably cloudless) reference image, for example. Alternatively, the structural analysis of the reference image has already been completed, and thus numerical values of the structure indices are already available for the homogeneous areas present therein.

Figure 13:
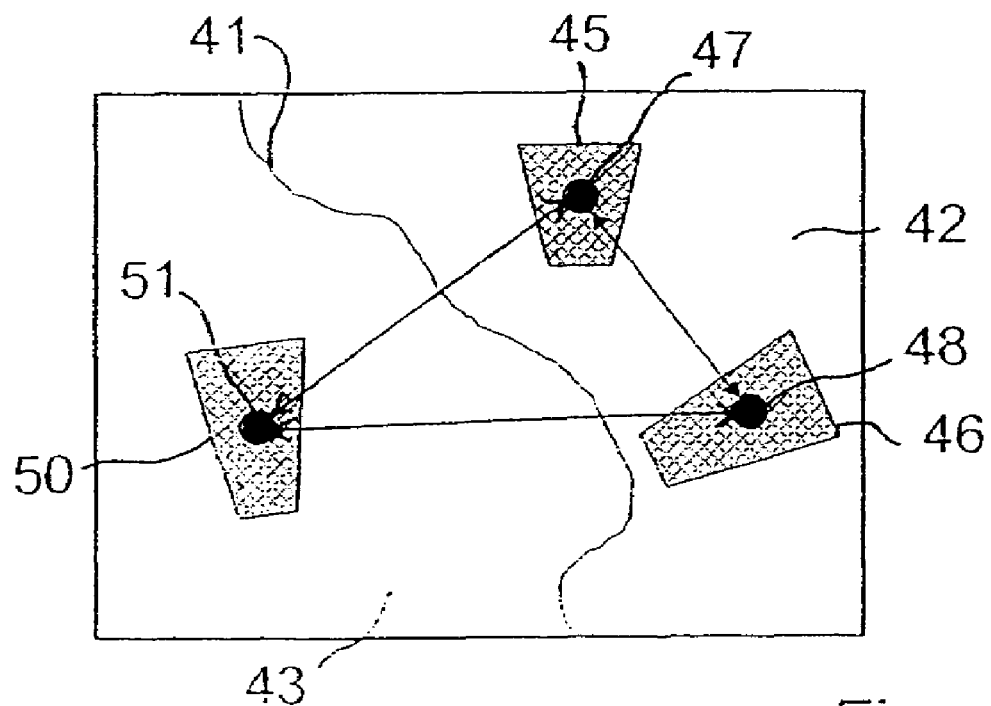
FIG. 13 is a schematic diagram of a reference image, which has been transformed into the satellite projection.
Figure 14:
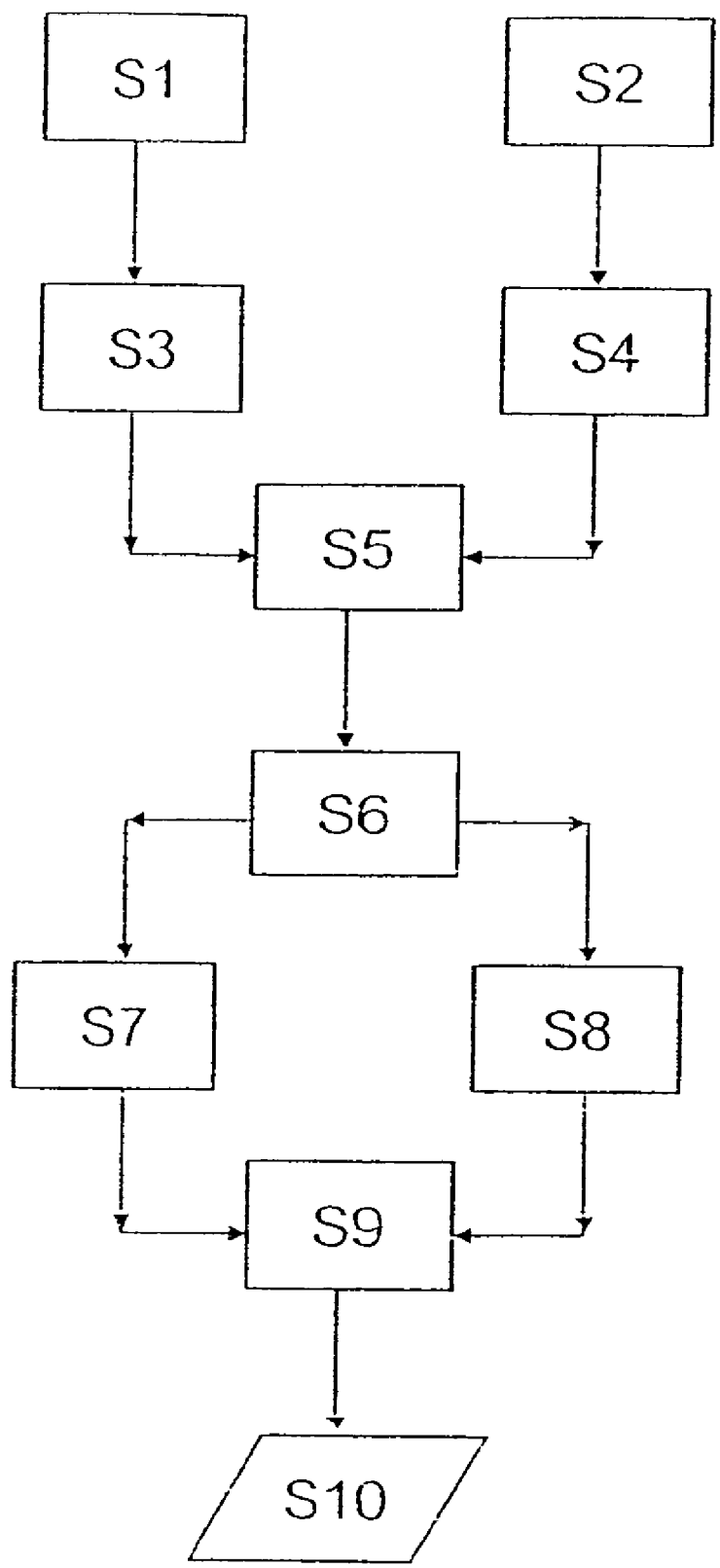
FIG. 14 is a flow chart, which represents the procedure according to an exemplary embodiment for making a structural analysis to determine position errors.

In an alternative embodiment of the structural analysis, areas suitable for evaluation (e.g., homogeneous areas again) are identified in the reference image and in the image matrix (e.g., the crosshatched areas 45, 46, 50 in FIG. 13, which represents the reference image without cloud cover). See the flow chart of FIG. 14 for an explanation of the procedure. In step S1, the areas are identified in the reference image, and in step S2 the areas are identified in the image matrix.

Overall, a large number of areas should be identified in each case. In steps S3 and S4, furthermore, areas in the reference image possibly corresponding to areas in the image matrix can also be identified, possibly after the areas have been classified (e.g., coniferous forest, farmland, urban area, water surface, etc.). A classification method suitable for this purpose is described in German Patent Application No. 199 39 732 A1, the complete content of which is hereby incorporated by reference.

If a correlation analysis (step S5) fails to find an area in the image matrix which corresponds to the reference image, it is possible in a preferred embodiment to use the cloud mask to determine whether or not this area is completely covered by clouds. If yes, then this reference area is eliminated from further processing. If no, the next step is to see whether or not an assignment can be made to a partially cloud-covered area. For this purpose, a correlation analysis of the cloud-free edge part of the area is carried out (e.g., to find a part of the overall reference area in question with corresponding edge parts).

Once the areas in the reference image have been assigned to the corresponding areas in the image matrix (step S6), the following procedure, for example, can be used to determine whether there is any incorrect positioning or incorrect orientation of the image matrix:

For each image, the geographic positions of the areas are determined (in step S7 for the reference image and in step S8 for the image matrix). In particular, the geographic positions of the area centers, the geographic positions of clearly identifiable points (e.g., at the edge of the area), and/or the geographic positions of the focal points (e.g., focal points 47, 48, 51 in FIG. 13) are calculated. The "focal point" is the point with the smallest integral of the distances, multiplied by themselves, from the edges of the area.

The relative positions are illustrated in FIG. 13 by lines connecting the focal points 47, 48, 51. From the large number of relative positions and from a comparison of the situations (step S9) in the two images, it is possible again to determine position errors and orientation errors (step S10). In turn, a mean value for the position differences and/or orientation differences of various groups consisting of at least three areas each, for example, can also be formed.

An exemplary embodiment is now described on the basis of FIGS. 15-19 to illustrate the transformation of the geographic data into a satellite projection. FIG. 15 shows the cartographic starting data, which were obtained by, for example, a projection perpendicular to the surface of a planet. Land surfaces are shown as dark areas, water surfaces as light areas.

FIG. 16 shows the same section of map as FIG. 15, but here a sub-area 25 is also drawn in, which corresponds to the area (i.e., an image matrix) observed by a satellite. In other words, the data available in the image matrix cover only the sub-area 25.

As a rule, the direction in which a satellite sees the surface of a planet does not corresponds to the projection of the cartographic data. For this reason, the cartographic data must be transformed. If, conversely, the image (in the satellite projection) recorded by the satellite were transformed into the coordinates of the cartographic starting data, the disadvantages previously described would be present again. In particular, the size of the matrix to be processed would be increased.

The first steep of the transformation is to determine the corner coordinates of the observed sub-area 25 (e.g., from the metadata). Then the sub-area 25 is rotated, so that it corresponds to the orientation of the recorded image. The cartographic data thus undergo merely a parallel shift with respect to the image data (e.g., a shift transverse to the direction of the rows in the image matrix). The resulting situation is shown in FIG. 17, where the sub-area recorded by the image matrix is located between lines 26 and 27. As the diagram according to FIG. 17 shows, the observed sub-area in the map projection is not completely rectangular, but rather distorted into a parallelogram. No observation data are available for the sub-areas lying outside the lines 26, 27. The sub-areas outside the lines 26, 27 are wedge-shaped and in the exemplary embodiment correspond to the extent to which the planet rotated while the satellite was flying over.

In the next step, the rotation of the planet is eliminated. The result is shown in FIG. 18. Three of the edges of the map segment now coincide with the observed area. In the figure, a line 28 is drawn in, which separates the sub-area of the map segment in agreement with the observed area from another sub-area for which no observation data are available. In the final step, the sub-area for which no observation data are available is cut off. Then, for example, the land/water boundaries recognizable in the map segment can be transferred to the image matrix or to a corresponding matrix, so that distances in the image matrix can be evaluated, or geographic data concerning the course of the land/water boundary line can be assigned to the pixels of the image matrix.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for selecting remote sensing data, which has been recorded by an airborne or spaceborne sensor, the method comprising:
   creating task profile data based upon at least one of a task and goal of use of the remote sensing data which has been recorded by the airborne or spaceborne sensor;
   assigning a physical data property to the task profile data to define a requirement on the use of the remote sensing data;
   checking data properties of the remote sensing data against the requirement to determine whether and to what degree the requirement can be satisfied by the remote sensing data; and
   outputting a result indicating whether and to what degree the requirement can be satisfied.

2. The method of claim 1, further comprising:
   creating user profile data describing properties of a user; and
      assigning a physical data property to both the task profile data and the user profile data to define a requirement on the use of the remote sensing data.

3. The method of claim 1, further comprising using the requirement to control data processing of the remote sensing data.

4. The method of claim 1, further comprising requesting and loading remote sensing data corresponding to the requirement, and using the requirement to control data processing of the remote sensing data.

5. The method of claim 1, wherein a physical model describes motion of airborne or spaceborne sensors relative to a surface of an object remotely sensed by the airborne or spaceborne sensors during remote sensing, and wherein the remote sensing data are or have been recorded by at least one of the airborne or spaceborne sensors, and further comprising; using the physical model in defining the requirement.

6. A method for selecting remote sensing data, comprising:
   creating task profile data based upon at least one of a task and goal of use of the remote sensing data;
   assigning a physical data property to the task profile data to define a requirement on the use of the remote sensing data;
   checking data properties of the remote sensing data against the requirement to determine whether and to what degree the requirement can be satisfied by the remote sensing data;
   checking available processing routines operable to process the remote sensing data against the requirement to determine whether and to what degree the requirement can be satisfied by the remote sensing data and the processing routines; and
   outputting a result indicating whether and to what degree the requirement can be satisfied.

7. A method for selecting remote sensing data, comprising:
   creating task profile data based upon at least one of a task and goal of use of the remote sensing data;
   assigning a physical data property to the task profile data to define a requirement on the use of the remote sensing data, wherein a physical model describes motion of satellites relative to a surface of an object remotely sensed by the satellites during remote sensing, and wherein the remote sensing data are or have been recorded by at least one of the satellites and;

using the physical model in defining the requirement;

checking data properties of the remote sensing data against the requirement to determine whether and to what degree the requirement can be satisfied by the remote sensing data; and outputting a result indicating whether and to what degree the requirement can be satisfied.

8. A method for selecting remote sensing data, comprising:

creating task profile data based upon at least one of a task and goal of use of the remote sensing data;

assigning a physical data property to the task profile data to define a requirement on the use of the remote sensing data;

checking data properties of the remote sensing data against the requirement to determine whether and to what degree the requirement can be satisfied by the remote sensing data;

comparing the requirement with a service profile of the remote sensing data, wherein the service profile and the requirement have same types and number of categories of properties of the remote sensing data, and wherein properties in the same categories of the service profile and the defined requirement are checked against each other pairwise; and outputting a result indicating whether and to what degree the requirement can be satisfied.

9. The method of claim 8, wherein the checking further comprises weighting differences and agreements of properties in the same categories in varying degrees according to a user's preferences.

10. The method of claim 8, wherein mathematical functions are assigned to possible requirements in at least one of the categories, a score being assigned by each of the functions to each of the possible properties in the service profile, and a degree of agreement of one of the requirements with one of the properties is found by determining the score on the basis of the assigned function and by using the score as the degree of agreement.

11. An apparatus for selecting remote sensing data, which has been recorded by an airborne or spaceborne sensor, the apparatus comprising:

an interface for entering task profile data defining at least one of tasks and goals of use of the remote sensing data which has been recorded by the airborne or spaceborne sensor;

an assigner connected to the interface for assigning at least one physical data property to the task profile data to define a requirement on the use of the remote sensing data;

a checker for checking data properties of available remote sensing data against the requirement;

an evaluator for determining whether and to what degree the requirement can be satisfied by the available remote sensing data; and an output unit for outputting a result of the determining performed by the evaluator.

12. The apparatus of claim 11, wherein a physical model describes motion of airborne or spaceborne sensors relative to a surface of an object remotely sensed by the airborne or spaceborne sensors during remote sensing, and wherein the remote sensing data are or have been recorded by at least one of the airborne or spaceborne sensors, and further comprising; using the physical model in defining the requirement.

13. The apparatus of claim 11, wherein a physical model describes motion of satellites relative to a surface of an object remotely sensed by the satellites during remote sensing, wherein the remote sensing data are or have been recorded by at least one of the satellites, and wherein the physical model is used in defining the requirement.

* * * * *